US012591598B2

(12) United States Patent
Polaczuk et al.

(10) Patent No.: US 12,591,598 B2
(45) Date of Patent: Mar. 31, 2026

(54) SYSTEMS AND METHODS FOR DETERMINING ENTITY ATTRIBUTE REPRESENTATIONS

(71) Applicant: Xero Limited, Wellington (NZ)

(72) Inventors: Maksymilian Clark Polaczuk, Wellington (NZ); Christopher Darius Herrmann, Wellington (NZ); Timothy Matthew Leathart, Wellington (NZ); Divya Jitesh Patel, Wellington (NZ)

(73) Assignee: Xero Limited, Te Aro (NZ)

(*) Notice: Subject to any disclaimer, the term of this patent is extended or adjusted under 35 U.S.C. 154(b) by 0 days.

(21) Appl. No.: 18/912,545

(22) Filed: Oct. 10, 2024

(65) Prior Publication Data

US 2025/0036662 A1 Jan. 30, 2025

Related U.S. Application Data

(63) Continuation of application No. 17/887,411, filed as application No. PCT/NZ2021/050063 on Apr. 14, 2021, now Pat. No. 12,147,454.

(30) Foreign Application Priority Data

Apr. 15, 2020 (AU) ................................ 2020901198

(51) Int. Cl.
*G06F 16/28* (2019.01)
*G06V 30/19* (2022.01)

(52) U.S. Cl.
CPC .......... *G06F 16/288* (2019.01); *G06F 16/285* (2019.01); *G06V 30/19093* (2022.01); *G06V 2201/09* (2022.01); *G06V 2201/10* (2022.01)

(58) Field of Classification Search
CPC ........ G06N 3/088; G06N 3/084; G06N 3/045; G06N 3/044; G06N 3/082; G06F 16/3322;

(Continued)

(56) References Cited

U.S. PATENT DOCUMENTS 8,944,321 B1 * 2/2015 Patterson ............... G06Q 30/02
235/487
9,875,740 B1 * 1/2018 Kumar ................... G10L 15/10

(Continued)

OTHER PUBLICATIONS

"Wikipedia, "Neural Network", published Apr. 13, 2020 (archived version) <URL: https://en.wikipedia.org/w/index.php?title= Neural_ network&oldid=9507 43626>Entire document.".

(Continued)

*Primary Examiner* — Etienne P Leroux

(74) *Attorney, Agent, or Firm* — Young Basile Hanlon & MacFarlane, P.C.

(57) ABSTRACT

A computer implemented method for determining entity attributes. The method comprises determining one or more entity identifiers, determining an entity server address of the entity based on the one or more entity identifiers, wherein the entity server address points to an entity server; verifying the entity server address transmitting a message for request for information to the entity server address, receiving entity information from the entity server; and providing, to a machine learning model, the received entity information. The machine learning model is trained to generate a numerical representations of entities based on the entity information.

17 Claims, 9 Drawing Sheets

(58) Field of Classification Search

CPC .............. G06F 16/288; G06F 16/285; G06V
30/19093; G06V 2201/10; G06V 2201/09
See application file for complete search history.

(56) References Cited

U.S. PATENT DOCUMENTS

| | | | | |
|---|---|---|---|---|
| 10,846,311 | B2 * | 11/2020 | Agarwal | G06F 16/2425 |
| 2016/0189047 | A1 * | 6/2016 | Meij | G06F 16/951 |
| | | | | 706/11 |
| 2017/0148093 | A1 * | 5/2017 | McCormick | G06Q 30/0633 |
| 2018/0040064 | A1 | 2/2018 | Grigg et al. | |
| 2018/0075539 | A1 | 3/2018 | Roberts et al. | |
| 2018/0082197 | A1 | 3/2018 | Aravamudan et al. | |
| 2018/0253469 | A1 * | 9/2018 | Shapira | G06F 16/2425 |
| 2019/0065576 | A1 | 2/2019 | Peng et al. | |
| 2019/0188200 | A1 * | 6/2019 | Erenrich | G06F 16/24558 |
| 2019/0220752 | A1 * | 7/2019 | Xu | G06F 16/28 |
| 2020/0042796 | A1 | 2/2020 | Kim et al. | |
| 2021/0058421 | A1 | 2/2021 | Dahlberg | |
| 2023/0245258 | A1 | 8/2023 | Ma et al. | |
| 2025/0037421 | A1 * | 1/2025 | Saraee | G06F 16/438 |

OTHER PUBLICATIONS

Xiong, C., et al., "Dynamic Coattention Networks For Question Answering", Computer Science, International Conference on Learning Representations 2017, pp. 1-14 (Mar. 6, 2018).

International Search Report and Written Opinion as issued in connection with International Patent Application No. PCT/NZ2021/050063, mailed Jul. 12, 2021, 12 pages.

International preliminary report on patentability as issued in connection with International Patent Application No. PCT/NZ2021/050063, mailed Oct. 13, 2022, 8 pages.

Non-Final Office Action in U.S. Appl. No. 17/887,411 dated on May 17, 2024, 7 pages.

Notice of Allowance in U.S. Appl. No. 17/887,411 dated on Jul. 11, 2024, 9 pages.

Rodriguez, J. J. et al., "Rotation forest: A new classifier ensemble method", IEEE transactions on pattern analysis and machine intelligence, vol. 28, No. 10, published Oct. 2006, pp. 1619-1630.

Wikipedia, "Neural Network", published Apr. 13, 2020 (archived version) <URL: https://en.wikipedia.org/w/index.php?title=Neural_network&oldid=950743626>.

Shuanga, K. et al., "A word-building method based on neural network for text classification", University of West London, UK, published 2019.

* cited by examiner

200

400

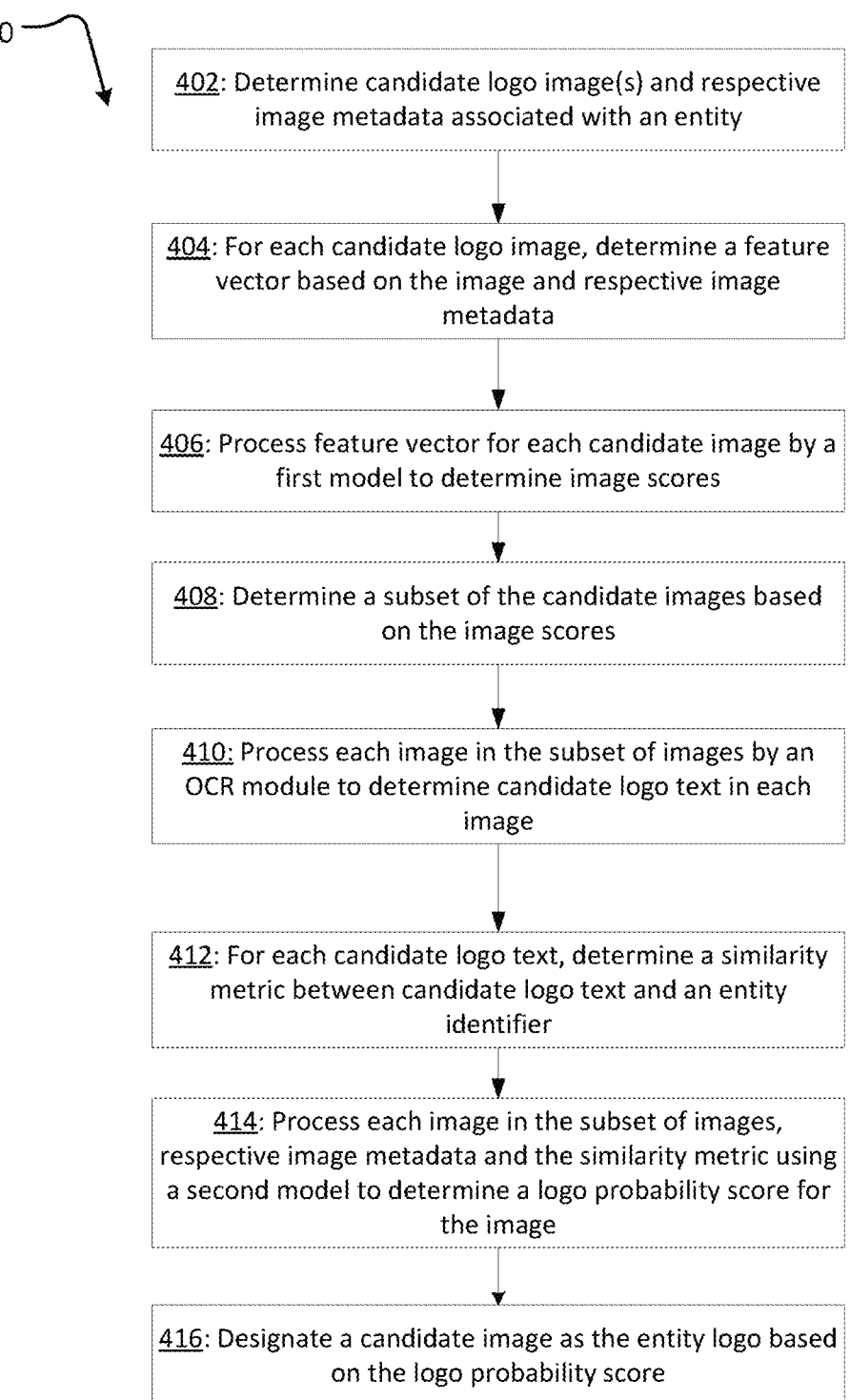

402: Determine candidate logo image(s) and respective image metadata associated with an entity 404: For each candidate logo image, determine a feature vector based on the image and respective image metadata 406: Process feature vector for each candidate image by a first model to determine image scores 408: Determine a subset of the candidate images based on the image scores 410: Process each image in the subset of images by an OCR module to determine candidate logo text in each image 412: For each candidate logo text, determine a similarity metric between candidate logo text and an entity identifier 414: Process each image in the subset of images, respective image metadata and the similarity metric using a second model to determine a logo probability score for the image 416: Designate a candidate image as the entity logo based on the logo probability score

Figure 4

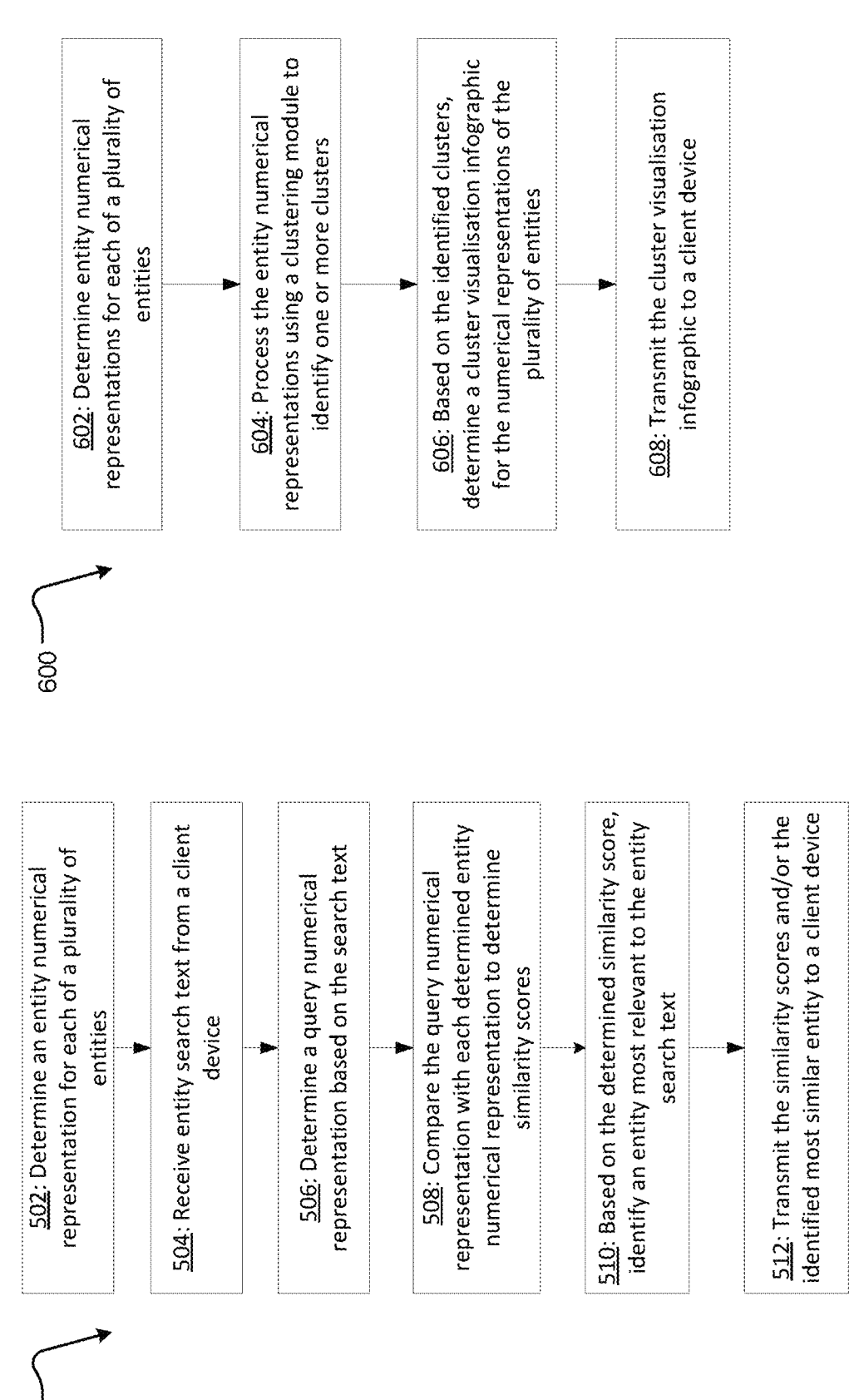

602: Determine entity numerical representations for each of a plurality of entities 604: Process the entity numerical representations using a clustering module to identify one or more clusters 606: Based on the identified clusters, determine a cluster visualisation infographic for the numerical representations of the plurality of entities 608: Transmit the cluster visualisation infographic to a client device

502: Determine an entity numerical representation for each of a plurality of entities 504: Receive entity search text from a client device 506: Determine a query numerical representation based on the search text 508: Compare the query numerical representation with each determined entity numerical representation to determine similarity scores 510: Based on the determined similarity score, identify an entity most relevant to the entity search text 512: Transmit the similarity scores and/or the identified most similar entity to a client device

SYSTEMS AND METHODS FOR DETERMINING ENTITY ATTRIBUTE REPRESENTATIONS

TECHNICAL FIELD

Described embodiments relate to systems, computer implemented methods and computer programs for determining entity attribute representations.

BACKGROUND

Information regarding entities such as businesses or individuals is important for providing specifically designed services or a customised or improved experience to the entities. Acquiring and processing entity information may require gathering entity related information from various repositories and information systems, cataloguing the gathered information in a format suitable for further processing, and processing the information to specifically design services or customise an experience offered to the entity.

It is desired to address or ameliorate some of the disadvantages associated with prior methods and systems for processing entity information, or at least to provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a computer implemented method for determining entity attributes, the method comprising: determining one or more entity identifiers associated with a target entity; determining at least one entity server address of the target entity based on the one or more entity identifiers, wherein the entity server address points to an entity server; verifying, by an entity identifier validation module, the at least one entity server address; transmitting a message to the at least one entity server address, the message comprising a request for information related to the entity; receiving entity information from the entity server in response to the request; providing, to a first machine learning model, the received entity information, wherein the first machine learning model has been trained to generate a numerical representations of entities based on entity information; determining, by the trained first machine learning model, an entity attribute representation based on the received entity information, wherein the entity attribute representation comprises a numerical representation of the information related to the entity.

In some embodiments, the method further comprises: receiving, the one or more entity identifiers, each entity identifier relating to a specific entity; verifying, by the entity identifier validation model, each of the one or more entity identifiers.

In some embodiments, the method further comprises predicting, by the trained first machine learning model, a plurality of entity attributes based on the determined entity attribute representation.

In some embodiments, the trained first machine learning model comprises a multi-task machine learning model.

In some embodiments, training of the multi-task machine learning model incorporates root mean square propagation during the training to improve the optimisation of the multi-task machine learning model.

In some embodiments, training of the multi-task machine learning model incorporates an equal spacing and batching of a training data set to improve the optimisation of the multi-task machine learning model.

In some embodiments, the multi-task machine learning model comprises a first recurrent neural network.

In some embodiments, the plurality of entity attributes comprises one or more of: entity location, entity category, entity type and entity employee information.

In some embodiments, the received information related to the entity comprises one or more web pages hosted by the entity server.

In some embodiments, the method further comprises validating each of the one or more web pages using a trained entity server address validation model.

In some embodiments, the method further comprises validating the entity information, by an entity information validation module, before providing the entity information to the first machine learning model.

In some embodiments, the entity information validation module comprises a second recurrent neural network trained to validate the entity information.

Some embodiments relate to a system for determining entity attributes, the system comprising: one or more processors; and memory comprising computer code, which when executed by the one or more processors implements an entity identifier validation module and a first machine learning model to configure the one or more processor to: determine one or more entity identifiers associated with a target entity; determine at least one entity server address of the target entity based on the one or more entity identifiers, wherein the entity server address points to an entity server; verify, by the entity identifier validation module, the at least one entity server address; transmit a message to the at least one entity server address, the message comprising a request for information related to the entity; receive entity information from the entity server in response to the request; provide, to the first machine learning model, the received entity information, wherein the first machine learning model has been trained to generate a numerical representations of entities based on entity information; determine, by the trained first machine learning model, an entity attribute representation based on the received entity information, wherein the entity attribute representation comprises a numerical representation of the information related to the entity.

In some embodiments, the one or more processor is further configured to: receive, the one or more entity identifiers, each entity identifier relating to a specific entity; verify, by the entity identifier validation model, each of the one or more entity identifiers.

In some embodiments, the one or more processor is further configured to predict, by the trained first machine learning model, a plurality of entity attributes based on the determined entity attribute representation.

In some embodiments, the trained first machine learning model comprises a multi-task machine learning model.

In some embodiments, training of the multi-task machine learning model incorporates root mean square propagation during the training to improve the optimisation of the multi-task machine learning model.

In some embodiments, training of the multi-task machine learning model incorporates an equal spacing and batching of a training data set to improve the optimisation of the multi-task machine learning model.

In some embodiments, the multi-task machine learning model comprises one or more first recurrent neural networks.

In some embodiments, the plurality of entity attributes comprises one or more of: entity location, entity category, entity type and entity employee information.

In some embodiments, the received information related to the entity comprises one or more web pages hosted by the entity server.

In some embodiments, the one or more processor is further configured to validate each of the one or more web pages using a trained entity server address validation model.

In some embodiments, the one or more processor is further configured to cause an entity information validation module to validate the entity information before providing the entity information to the first machine learning model.

In some embodiments, the entity information validation module comprises a second recurrent neural network trained to validate the entity information.

The trained first machine learning model of some embodiments is further configured to determine an attention score associated with each word or group of words in the entity information, the attention score indicating a relative significance of each word or group of words for determination of an entity attribute.

The determined entity attribute representation of may relate to a first entity attribute representation for a first target entity. The method of some embodiments may further comprise determining a second entity attribute representation based on one or more entity identifiers associated with a second target entity.

The method of some embodiments may further comprise determining a similarity metric between the first target entity and the second target entity based on the similarity between the determined first entity attribute representation and second entity attribute representation.

The entity identifier validation module of some embodiments may comprise a character-based deep learning model that is configured to process one or more email addresses associated with the target entity and a business name associated with the target entity to validate the at least one entity server address.

The method of some embodiments further comprises:

extracting one or more candidate logo images from information associated with an entity;

providing each candidate logo image to an optical character recognition (OCR) module to determine candidate logo text associated with each candidate logo image;

determining, as an output of the OCR module, candidate logo text associated with each candidate logo image;

for each candidate logo text, determining a logo text similarity metric indicating a similarity between the candidate logo text and an entity identifier;

based on the determined logo text similarity metric, determining a candidate entity logo as a designated entity logo.

The method of some embodiments further comprises:

extracting one or more candidate logo images and respective metadata from information associated with an entity;

determining a candidate logo feature vector for each of the one or more candidate logo images based on the respective metadata;

providing each candidate logo image to an optical character recognition (OCR) module to determine candidate logo text associated with each candidate logo image;

determining, as an output of the OCR module, candidate logo text associated with each candidate logo image;

for each candidate logo text, determining a logo text similarity metric indicating a similarity between the candidate logo text and an entity identifier;

for each candidate logo image, providing the candidate logo feature vector and the logo text similarity metric to a first logo determination model configured to determine a logo probability score;

determining, as an output of the first logo determination model, a logo probability score for each candidate logo image;

based on the determined logo probability scores, determining a candidate entity logo as a designated entity logo.

The method of some embodiments further comprises:

providing each candidate logo feature vector to a second logo determination model, the second logo determination model configured to determine a logo association score for the candidate logo image corresponding to the candidate logo feature vector;

determining, as an output of the second logo determination model, a logo association score for each the candidate logo image;

determining a subset of the one or more candidate logo images based on the determined logo association scores and threshold logo association score value;

wherein the providing each candidate logo image to an optical character recognition (OCR) module is limited to the determined subset of the one or more candidate logo images.

In some embodiments, the candidate logo image metadata comprises one or more of: candidate logo image file path, or a candidate logo image file name, or a candidate logo image HTML tags.

In some embodiments, the candidate logo feature vector is determined based on a presence of an entity name or a part of an entity name in one or more of the candidate logo image metadata.

In some embodiments, the second logo data processing model comprise a second set of weights; and the logo association score is determined based on a dot product of the candidate logo feature vector and the second set of weights.

In some embodiments, determining the logo text similarity metric comprises determining a string distance between the logo text and the entity identifier.

In some embodiments, the first logo data processing model comprises a first set of weights; and wherein determining the logo probability score comprises determining a dot product of the candidate logo feature vector and the first set of weights.

In some embodiments, the first and/or second set of weights are determined using logistic regression and a training dataset, each record in the training dataset comprising a plurality of training candidate logo images, training candidate logo metadata and a labelled candidate logo image corresponding to each record in the training dataset.

In some embodiments, the first logo data processing model and/or the second logo data processing model comprise a random forest model or a trained neural network.

Some embodiments relate to a computer-implemented method comprising:

providing, to a first machine learning model, entity information for each of a plurality of entities, wherein the first machine learning model has been trained to generate an entity numerical representation for each of the plurality of entities based on the respective entity information of the entity;

determining, by the trained first machine learning model, a plurality of entity numerical representations based on the received respective entity information for the plurality of entities, wherein the entity numerical representation comprises a numerical representation of the information related to the entity;

receiving an entity search text from a computing device;

providing the entity search text to the trained first machine learning model to generate query numerical representation of the entity search text;

comparing the query numerical representation with each of the plurality of entity numerical representations to determine a similarity score indicating a similarity between the query numerical representation and a respective entity numerical representation; and based on the determined similarity scores, identifying an entity numerical representation most similar to the entity search text.

In some embodiments, comparing the query numerical representation with each of the plurality of entity attribute numerical representations is performed by a matrix multiplication operation.

In some embodiments, the trained first machine learning model comprises a character embedding module, word embedding module, character-word composite embedding module and a composite numerical representation processing module, and wherein determining, by the trained first machine learning model, a plurality of entity numerical representations based on the received respective entity information for the plurality of entities comprises:

determining, by the character embedding module a character numerical representation for each character in the respective entity information;

determining, by the word embedding module a word numerical representation for each word in the respective entity information;

providing, to the character-word composite embedding module the determined character and word numerical representations;

determining, by the character-word composite embedding module a composite character-word numerical representation for each word based on the determined word numerical representations and the character numerical representations for each respective character in each word;

providing, to the composite numerical representation processing module the composite character-word numerical representation for each word in the entity information;

determining, by the composite numerical representation processing module an entity numerical representation based on the composite character-word numerical representations.

Some embodiments relate to a computer-implemented method comprising:

providing, to a first machine learning model, entity information for each of a plurality of entities, wherein the first machine learning model has been trained to generate a numerical representation for an entity based on respective entity information of that entity;

determining, by the trained first machine learning model, a plurality of entity numerical representations based on the received entity information for the plurality of entities, wherein the entity attribute numerical representation for each entity of the plurality of entities comprises a numerical representation of the information related to the entity;

identifying one or more clusters of determined entity attribute numerical representations, each cluster corresponding to one or more characteristics common to the entities associated with the entity attribute numerical representations of the cluster.

In some embodiments, identifying the one or more clusters comprising using k-means clustering, or mean shift clustering, or hierarchical clustering, or distribution based clustering, or density based clustering.

In some embodiments, the trained first machine learning model comprises a character embedding module, a word embedding module, a character-word composite embedding module and a composite numerical representation processing module, and wherein determining, by the trained first machine learning model, a plurality of entity numerical representations based on the received respective entity information for the plurality of entities comprises:

determining, by the character embedding module, a character numerical representation for each character in the respective entity information;

determining, by the word embedding module, a word numerical representation for each word in the respective entity information;

providing, to the character-word composite embedding module, the determined character and word numerical representations;

determining, by the character-word composite embedding module, a composite character-word numerical representation for each word based on the determined word numerical representations and the character numerical representations for each respective character in each word;

providing, to the composite numerical representation processing module, the composite character-word numerical representation for each word in the entity information; and determining, by the composite numerical representation processing module, the entity numerical representation based on the composite character-word numerical representations.

Some embodiments relate to a computer implemented method comprising:

providing entity information to a character embedding module and a word embedding module;

determining, by the character embedding module, a character numerical representation for each character in the entity information;

determining, by the word embedding module, a word numerical representation for each word in the entity information;

providing, to a character-word composite embedding module, the determined character and word numerical representations;

determining, by the character-word composite embedding module, a composite character-word numerical representation for each word based on the determined word numerical representations and the character numerical representations for each respective character in each word;

providing, to a composite numerical representation processing module, the composite character-word numerical representation for each word in the entity information; and determining, by the composite numerical representation processing module, an entity numerical representation based on the composite character-word numerical representations.

In some embodiments, determining, by the numerical representation module, a numerical representation of the entity further comprises:

processing the character-word numerical representation for each word in the entity information by an attention score determination module to determine an attention score for each word in the entity information.

The method of some embodiments further comprises processing by an entity attribute prediction module the entity numerical representation to predict an entity attribute value.

Some embodiments relate to a machine-readable medium storing computer readable code, which when executed by one or more processors is configured to perform the method of any one of the embodiments.

BRIEF DESCRIPTION OF DRAWINGS

FIG. 4 is a process flow diagram of a computer-implemented method of processing entity information to determine an entity logo, according to some embodiments;

FIG. 5 is a process flow diagram of a computer-implemented method of performing an entity search operation based on numerical representations of entities;

FIG. 6 is a process flow diagram of a computer-implemented method of performing clustering of entity numerical representations;

DESCRIPTION OF EMBODIMENTS

Figure 1:
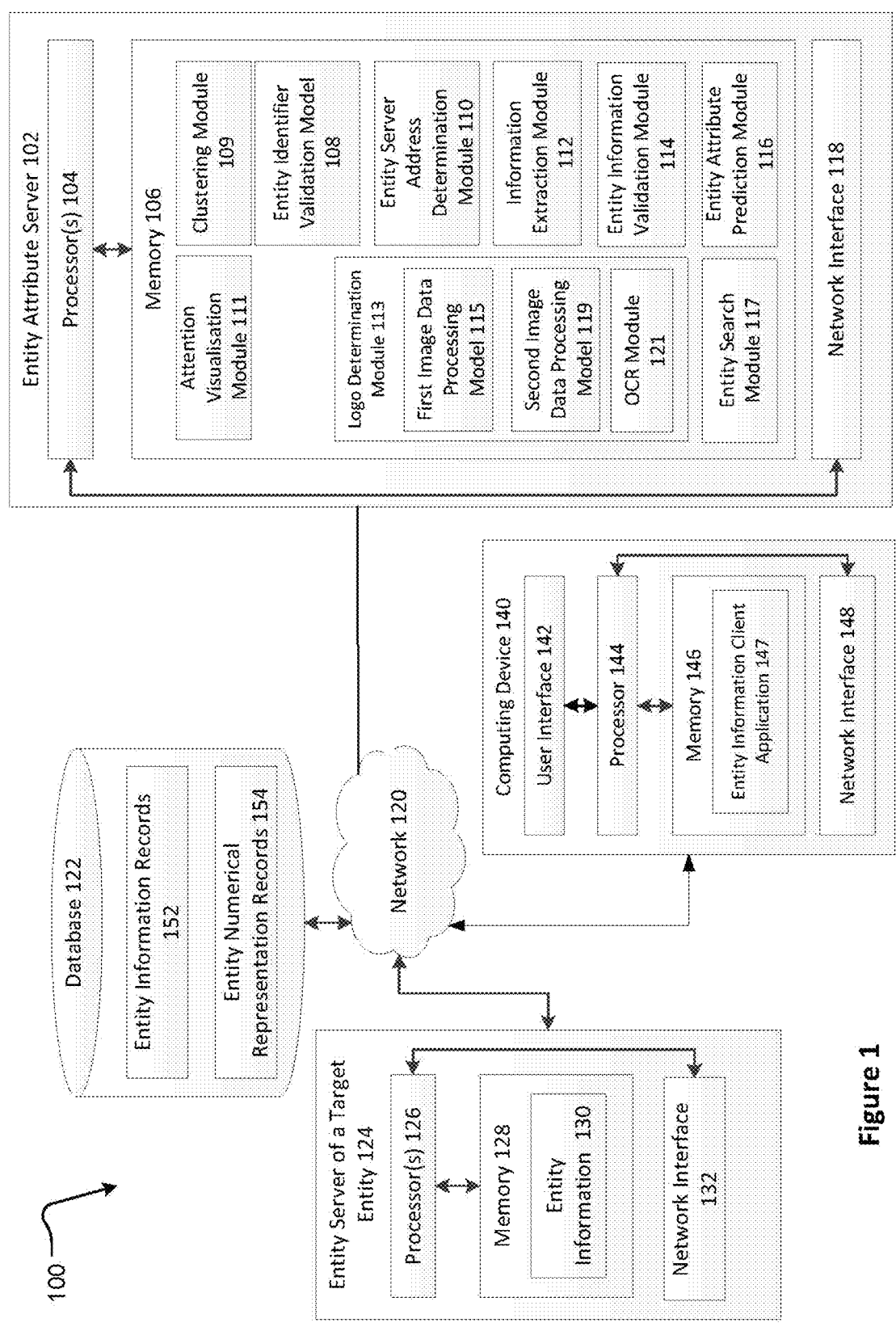
FIG. 1 is a block diagram of a system for determining entity attributes, according to some embodiments.

Described embodiments relate to systems, computer implemented methods, machine-readable medium storing computer readable code (e.g., a non-transient machine-readable medium), and computer programs for determining entity attribute representations. For example, entity attribute representations may comprise numerical representations, such as multi-dimensional vectors. Some embodiments relate to determining entity attributes, such as entity location, entity category, entity type and entity employee information, from the entity attribute representations.

In some embodiments, entity related data, from which the entity attribute representations may be determined, is retrieved or extracted from one or more sources, and inter-relationships or cross references between the entity related data are determined, from which the entity attribute representations may be determined. Retrieval of data from multiple sources and/or cross referencing of the retrieved data may provide for greater confidence in the retrieved data and ultimately may provide greater confidence in the entity attribute representations determined based on the retrieved data.

Information regarding entities is often fragmented across various computer systems or servers on the internet or other information sources accessible over a computer network. In some embodiments, the entity related data is determined by collating or gathering information fragmented over different computer systems in a network, for example, by collating or gathering information accessible through web pages on the internet. In some embodiments, the information sources are verified before entity date is retrieved from the sources. Entity data or information may include information regarding an entity obtained from a website relating to the entity. Entity information may include a location associated with the entity, such as a business location or a location of offices of the entity. In some embodiments, entity data or information may include a logo associated with an entity determined based on an analysis of images and image metadata extracted from various computer systems or servers relating to an entity.

In some embodiments, the entity related data is enriched by identifying interrelationships or cross references between the gathered data and supplementing the data with this information to generate an enriched data set for the entity. In some embodiments, identifying interrelationships or cross references may be performed using a multi-task machine learning model. Enrichment of entity data may enable improved inferences or predictions of one or more characteristics of the entity.

The entity related data, or in some embodiments, the enriched entity related data is provided to one or more machine learning frameworks or models to determine a numerical representation or multi-dimensional vector representation of the entity. The machine learning framework(s) may include a multi-task text classification and sequence tagging deep learning model framework.

In some embodiments, inferences or predictions about the nature of the entity may be made based on the numerical representation of the entity. One example of an inference obtained from the generalised numerical representation may include a classification of the industry to which the entity belongs. Industry classification may include classifications such as: retail, agriculture, trade, for example.

Inferences regarding an entity may enable provision of specifically designed or targeted services based on inferences. Different entities may have different needs and inferences regarding the entities may enable an improved targeting of services offered to the entities. For example, if an inference indicates that an entity is in the retail industry, then accounting services relevant to the retail industry may be offered to the entity based on the inference.

In some embodiments, the numerical representation or multi-dimensional vector representation of entities may be used to cluster a number of entities into distinct clusters.

Each distinct cluster may relate to one or more entities that share common characteristics, such as the nature of the business operated by the entity or the entity location. The distinct clusters may advantageously allow identification of similar entities based on the numerical representations determined using entity information.

In some embodiments, the numerical representation of the entities may be used to provide effective and/or efficient searching capabilities. For example, given a search term or a query text, which may for example be received from a user at a user interface, a numerical representation of the query text may be generated and the numerical representation of the query text may be compared with a database of numerical representations of entities to identify an entity or entities relevant to the search term or query text. The numerical representations of entities may thus provide a computationally efficient and/or more accurate means for performing a search through a large amount of entity information encoded as numerical representations.

In some embodiments, text or characters extracted from various computer systems or servers relating to an entity may be analysed to determine a significance score or an attention score associated with a word or each word or a group of words of the extracted text. The significance score or attention score may be indicative of a descriptive relevance of the word or group of words to an entity. The significance score or attention score may be indicative of a degree of contribution of a word or group of words to the numerical representation of an entity. The significance scores or attention scores may assist in visualisation of the relevance of each word or group of words to a numerical representation.

Examples merely illustrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 illustrates a system 100 for determining entity attribute representations, according to some embodiments. System 100 comprises an entity attribute server 102 in communication with at least one entity server 124 over a communications network 120. The entity attribute server 102 may be also in communication with a database 122 over the communications network 120. In some embodiments, the database 122 may be implemented or deployed within the entity information attribute server 102. System 100 may comprise a computing device 140 in communication with the entity attribute server 102 over the communication network 120.

In some embodiments, the database 122 may comprise entity information records 152, which may comprise entity information 130 extracted from the entity server 124. Storing the entity information records 152 in database 122 may allow for analysis of the entity information 130 without the need to query the entity server 124. In some embodiments, the database 122 may comprise entity numerical representation records 154. The entity numerical representation records 154 may comprise numerical representations associated with entities generated by an entity attribute prediction module 116 of the entity attribute server 102. The entity numerical representation records 154 may provide for searching operations by the entity search module 117.

The at least one entity server 124 comprises at least one processor 126, at least one memory 128 accessible to the processor 126 and a network interface 132 to facilitate communication between the entity server 124 and other components of the system 100 over the network 120. Memory 128 comprises entity information 130. The entity server(s) 124, in some embodiments, may comprise a web server (not shown) hosting one or more web pages comprising information relating to an entity. In embodiments where the entity server 124 is a web server hosting one or more web pages, the entity information 130 may be provided in web page content including text and/or images accessible through the web pages. Entity information 130 stored on the entity server 124 may be extracted or accessed by an information extraction module 112 of the entity attribute server 102.

The entity attribute server 102 comprises a network interface 118 that may be a hardware component, a software component or a combination of hardware and software components to facilitate communication of the entity attribute server 102 with other components of the system 100 over the network 120. The network 120 may include, for example, at least a portion of one or more networks having one or more nodes that transmit, receive, forward, generate, buffer, store, route, switch, process, or a combination thereof, etc. one or more messages, packets, signals, some combination thereof, or so forth. The network 120 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fiber optic network, some combination thereof, or so forth.

The entity attribute server 102 comprises at least one processor 104. The processor 104 is in communication with at least one memory 106. Within memory 106 are implemented various software components that enable various processes for determining entity attribute representations, according to described methods. The various software components may include an entity identifier validation module 108, an entity server address determination module 110, an information extraction module 112, an entity information validation module 114, an entity attribute prediction module 116, an entity search module 117, such as a Natural Language Processing (NLP) search module, a clustering module 109, an attention visualisation module 111, and/or a logo determination module 113. Memory 106 may comprise further software components necessary to provide the capability of the system 100 as necessary.

The entity identifier validation module 108 is configured to determine the validity of one or more candidate entity identifiers of an entity. For example, example candidate entity identifiers of an entity may comprise an email address, (for such as an email address of an employee) a business or entity name and/or a URL of an entity. In some embodiments, the entity identifier validation module 108 is configured to query one or more databases or directories of entity identifiers to determine whether the candidate entity identifiers are valid. The one or more databases or directories of entity identifiers may include databases including invoice data, or accounting data relating to the entity.

The entity server address determination module 110 comprises one or more models that receive, as an input, one or more validated entity identifiers and predict a server address or domain name for the entity. In some embodiments, the entity server address determination model 110 may comprise one or more trained machine learning models. The server address or domain name points to the entity server 124. Accordingly, in some embodiments, the entity attribute server 102 may transmit messages including requests for entity information to the entity server 124 using the server address or domain name.

In some embodiments, the trained machine learning models of the entity identifier validation module 108 and/or the server address determination module 110 may be implemented using a character-based deep learning model. As an output the trained machine learning models may determine an indication or a probability of a validity of an entity identifier such as a URL or a web address relating to one or more entity servers relating to an entity. In some embodiments, the probability of a validity of an entity identifier such as a URL or a web address is indicative of the entity identifier being related to or associated with a business. The character-based deep learning models according to some embodiments may be configured to process text in any received input at a character level. Each character in an input text and the sequence of characters in an input text may serve as data processed by the character-based deep learning models to determine validity of an entity attribute or to determine an entity server address. In some embodiments, the trained machine learning models may further comprise one or more dynamic coattention neural network layers that require fewer parameters than conventional models trained to perform similar tasks reducing the memory required to store or execute the entity server address determination module 110. The one or more one or more dynamic coattention neural network layers may be implemented as described in the research paper titled 'Dynamic Coattention Networks for Question Answering' by Xiong et al. accessible at https://arxiv.org/abs/1611.01604.

The training dataset for the machine learning models for the entity server address determination module 110 may include a dataset comprising validated entity attribute values such as email addresses and/or entity names and a valid URL or a web address relating to the entity. The training dataset may embody information and the various variations in the association between entity identifiers and entity web server addresses that may be learned by the machine learning models for the entity server address determination module 110 through a training process.

The information extraction module 112 comprises program code, which when executed by the processor 104, enables the entity attribute server 102 to determine, retrieve or extract entity information 130 from one or more entity servers 124. For example, the information extraction module 112 may allow for entity information to be obtained from several entity servers 124 in parallel by transmitting fetching requests to the several entity servers 124 at the same time or an overlapping time. In some embodiments, the information extraction module 112 is configured to obtain any, all or specific text, images and/or other information or embedded information published or otherwise available on one or more web pages hosted on the entity server 124, for example.

The entity attribute prediction module 116 comprises one or more machine learning models that determine a numerical representation, such as a multi-dimensional vector, of an entity based on the entity information 130 obtained by the information extraction module 112 and predict entity attributes based on the generalised numerical representation of the entity.

In some embodiments, the entity attribute prediction module 116 comprises a multi-task machine learning model. Conventional machine learning models tend to focus on optimising a specific metric or estimating a particular output. If more than one metric or outputs are intended to be estimated, then independent machine learning models are trained to estimate each metrics or output. The conventional training of independent machine learning models for separate tasks ignores the commonalities in the estimation or learning process across separate tasks in a common domain. Multi-task learning leverages training signals generated during training for related tasks or related metric estimations to obtain an improved intermediate generalisation using a training dataset and performs multiple tasks using the intermediate generalisation. The multi-tasks may include prediction of a location associated with the entity, prediction of the industry category that the entity belongs to, for example.

The various entity attributes or metrics that may be predicted by the entity attribute prediction module 116 may include one or more of: industry labels identifying one or more categories of industries that an entity is associated with; an identifier of the entity type, such as indicating whether the entity is a sole trader entity; an identifier indicating capabilities or specialties, for example, whether the entity is a tech savvy entity, for example.

In some embodiments, the one or more machine learning models of the entity attribute prediction module 116 may comprise one or more artificial neural networks. Artificial neural networks (ANNs) are computational models that are inspired by the structure of neurons or nerve cells that process sensory input in animals. An ANN comprises nodes connected by directed links connecting one node to another. Each link has a numeric weight associated with it. Each node applies an activation function to a weighted sum of the inputs to the node and transmits the output of the activation function. The nodes in an ANN are organised in layers, and outputs from one layer of nodes are provided as input to a subsequent layer of nodes (feed-forward neural network). In some embodiments, the output of one layer of nodes may also be provided back as inputs to the same layer (recurrent neural network).

In some embodiments, the ANNs of the entity attribute prediction module 116 may be arranged to perform multi-task learning. In some embodiments, certain intermediate or hidden layers of the ANNs may be shared across different tasks to perform multi-task learning. This arrangement may be described as hard parameter sharing for multi-task learning.

In some embodiments that implement multi-task learning, each task may have its own model defined by its own parameters. However, during training of the ANNs, the differences or distance between the parameters defining each model may be reduced or regularised to encourage similarity between the parameters. This arrangement may be described as soft parameter sharing for multi-task learning.

In embodiments that implement the multi-task learning, the training process for the multi-task machine learning model of the entity attribute prediction module 116 may be specifically managed to improve the accuracy of the predictions by the entity attribute prediction module 116. For training of the multi-task machine learning models, the input remains the same (i.e. entity information 130) but the output depends on the task at hand. In some embodiments, the training process may be equally spaced across the more than one task. The equal spacing may comprise separating the training data set into separate batches for each task, and performing a training iteration for a first task, followed by a second task, followed by a third task, until an iteration is run for the final task. During each iteration, the value of a loss function for the respective task is calculated and based on the value of the loss function, the weights of the neural networks of the multi-task machine learning model are adjusted, using a gradient-descent algorithm, for example. This interleaving or equal spacing of training iterations across the several tasks and use of batches of separate datasets for each task enables the multi-task machine learning model of the entity attribute prediction module 116 to learn from training data associated with different tasks at once and assists in avoiding the problem of overfitting the multi-task machine learning model to a specific task.

In some embodiments, the one or more ANNs of the entity attribute prediction module 116 may be Recurrent Neural Networks (RNNs). RNNs are neural networks that are structured to process sequential information or data. RNNs exhibit temporal dynamic behaviour wherein the output associated with an input depends on an internal state or hidden state or memory of the RNN. The internal state or hidden state is defined based on one or more previous outputs generated by the RNN while processing the series of inputs. To improve the learning capacity and performance of RNNs, they need to be specifically calibrated depending upon the varying lengths of the series of inputs. If an input sequence is long, unless it is specifically calibrated, an RNN may not optimally utilise its learning from an earlier part of the input sequence to process later parts of a sequence.

In some embodiments, the RNNs of the entity attribute prediction module 116 may be trained using a stochastic gradient descent optimization algorithm. Stochastic gradient descent optimization comprises first the estimation of the loss on one or more training examples, then the calculation of the derivative of the loss (gradient), which is propagated backward through the RNN to update weights of the links defined in the RNN. Weights are updated using a fraction of the back propagated error controlled by a defined learning rate. Meaningful values of the gradients through several layers of the RNN allows training of an effective or optimum RNN.

In order to improve the performance and accuracy of the learning process and the performance of the trained RNNs, in some embodiments, a gradient clipping technique is performed. Gradient clipping comprises limiting the gradient values to a specific minimum or maximum value if the gradient exceeds an expected range. The maximum gradient value may be defined as a maximum L2 norm of a vector of the weights comprised in the RNN. An L2 norm of a vector is calculated as the square root of the sum of the squared vector values. In some embodiments, the maximum L2 norm of a vector of the weights comprised in the RNN may be set value in the range of 4 to 5, for example. Incorporating gradient clipping during the training process allows the RNNs comprised in the entity attribute prediction module 116 to learn from longer sequences of entity information 130 that serves as an input to the entity attribute prediction module 116. Gradient clipping thereby enables the entity attribute prediction module 116 to learn from larger amounts of information while improving the accuracy of the output of the entity attribute prediction module 116.

In some embodiments, the entity attribute prediction module 116 may incorporate character level embedding for processing the entity information 130. Character level embedding comprises use of a one-dimensional convolutional neural network (1D-CNN) to find a numeric representation of each word in the entity information 130 by looking at a character-level composition of each word. In some embodiments, each character level composition of each word may be represented using a vector of 64 units, for example. Character level embedding advantageously enables a more fine grained training of the ANNs of the entity attribute prediction module 116 improving the quality and reliability of the predictions.

In some embodiments, RNNs comprised in the entity attribute prediction module 135 may comprise one or more layers of Gated Recurrent Units (GRUs). An exemplary GRU may comprise an update gate and a reset gate, each gate being defined by a vector of values between 0 and 1. Both the update gates and the reset gates are trained to selectively filter out irrelevant information while keeping information that is relevant for improved entity attribute prediction. The reset gate determines which portions of a previous hidden state of the RNN are to be combined with a current input to determine a proposed new hidden state. The update gate determines to what extent a previous hidden state of the RNN is to be retained and which portions of the proposed new hidden state (determined by the reset gate) is to be retained in a final or subsequent hidden state.

GRUs advantageously stabilise the process of updating gradients during training of RNNs. The stabilisation helps avoiding gradients that vanish (become too close to 0) or explode (become close to infinite) during the training process. In essence, GRUs assist in stabilizing the training process to avoid gradients defining the RNN from becoming too small or too large, thereby assisting the RNN in meaningfully modelling the domain and providing more accurate entity attribute predictions.

GRUs also enable the RNN to retain long-term dependencies or relationships in a sequence of input data. For example, if entity information 130 obtained from an entity server 124 is particularly large, then the GRUs assist in a more holistic consideration of the entity information 130 during the training process. The better consideration of long-term dependencies assists in improved entity attribute prediction. In some embodiments, the RNNs implemented by the entity attribute prediction module 116 may comprise 512 layers of GRUs, for example.

The ANNs of the entity attribute prediction module 116, in some embodiments, may implement a dropout technique during the learning process to improve generalisation of the domain by the ANN and reduce the risk of overfitting during training. The dropout technique comprises randomly ignoring outputs obtained from one or more nodes or units of the ANN. Dropping out certain nodes or units forces other nodes or units to take on greater responsibility for processing the inputs to produce a more accurate output. In essence, the dropout technique makes the training process more variable and enables training of one part of the ANN to correct mistakes or inaccuracies of another part of the ANN, thereby producing a trained ANN that is more resilient and not over fitted to the domain. Dropout of units or nodes may be implemented by defining the probability (dropout rate) of a unit or node being dropped out during one iteration of processing training data. In some embodiments, the dropout rate may be 0.1.

In some embodiments, the ANNs of the entity attribute prediction module 116 may employ an RMSprop optimisation technique during training of the ANNs to efficiently train the ANNs and obtain trained ANNs that provide more accurate entity attribute predictions. The RMSprop optimisation technique involves a gradient descent optimization algorithm modified to calculate an exponential average of gradients. The exponential average of gradients are calculated separately for each weight of the ANN. Subsequently, the exponential average of gradients is used to gradually obtain a variable learning rate obtained by dividing an initial learning rate by the exponential average of gradients. By more finely calibrating the learning process, the RMSprop optimisation technique enables a more efficient optimisation of the ANNs. In some embodiments, the RMSprop optimisation technique may be implemented with an initial learning rate of 0.0002, for example.

In some embodiments, the RMSprop optimisation technique may also incorporate a weight decay configuration. The weight decay configuration allows the penalisation of large weight values during the learning process in proportion to the size of the weight. The degree to which the weight decay penalisation is applied during the learning process is controlled using a weight decay parameter. In some embodiments, the weight decay parameter may be 0.00001, for example. Incorporating the weight decay configuration during training further assists in avoiding overfitting of the ANN to the training dataset.

In some embodiments, the entity information validation module 114 may be configured to validate the entity information extracted by the information extraction module 112 before it is provided to the entity attribute prediction module 116. Validation of the entity information may comprise checking whether the quality of the entity information is suitable for driving prediction of entity attributes by the entity attribute prediction module 116. In some embodiments, the entity information validation module 114 may comprise trained ANNs that accept as input the entity information and determine as output an indicator of the validity of the entity information. In some embodiments the ANNs of the entity information validation module 114 may include one or more RNNs. As an example, if the entity information is obtained from a web page that includes the text "Under Construction" indicating that the web pages are not up to date or are being prepared, the entity information validation module 114 predicts that the entity information is not suitable for supporting prediction of entity attributes and is accordingly invalid. The ANNs of the entity information validation module 114 may be trained using a training dataset comprising labelled website data. The labels may include an indication of whether the website data is valid or invalid for entity attribute prediction.

The entity search module 117 comprises program code, which when executed by the processor 104, enables a search of entity information 130 based on one or more search terms or a search phrase. The entity search module 117 may process the one or more search terms or a search phrase to obtain a search vector representation of the one or more search terms or a search phrase. The search vector may represent a numerical representation of the content that the search is directed to. The entity search module 117 may then compare the numerical representation or multi-dimensional vector representation of several entities with the search vector. Based on the comparison, the entity search module 117 may search through large amounts of entity information 130 across several servers 124 more efficiently. Further, the search results produced by the entity search module 117 may have an improved accuracy and reliability in comparison to search results generated using a conventional keyword based search. A keyword based search generates search results based on indexing or selection of keywords within the content being searched, thereby being limited to the presence or absence of specific keywords in the content being searched. In contrast, the entity search module 117 incorporating natural language processing based search techniques operates on the underlying semantic meaning in the content being searched and the search terms as represented using numerical representations. Thus the modelling and representation of semantic meaning of the searched content using numerical representations allows search operations to not be restricted to the mere presence or absence of search keywords in the search content, thereby providing search results that are more accurate and are based on semantic meaning of the search terms and the searched content.

The clustering module 109 may comprise program code, which when executed by the processor 104, causes processing of the numerical representation or multi-dimensional vector representation of several entities and identification of one or more distinct clusters. Each cluster may relate to one or more entities sharing common characteristics based on their respective entity information 130. The clustering module 109 may perform the clustering using k-means clustering, or mean shift clustering, or hierarchical clustering, or distribution based clustering, or density based clustering techniques, for example. Clustering of numerical representations corresponding to entities may allow identification of groups or clusters of entities that may not be otherwise readily perceivable based on the entity information 130.

The attention visualisation module 111 may comprise program code, which when executed by the processor 104, generates a visualisation of attention scores associated with words or phrases extracted from the entity information 130. The generated visualisations may be transmitted to the computing device 140 for display to a user. The attention visualisation module 111 receives as input one or more attention scores associated with words or text from entity information generated by the entity attribute prediction module 116 of some embodiments. The attention score visualisation may be in the form of a heat map associated with words or text, or a word cloud graphic wherein a relative size of a word indicates its relative attention score or importance, for example.

The logo determination module 113 may comprise program code, which when executed by the processor 104, processes images extracted from the entity information 130 to identify one or more logos or logo images associated with a particular entity. The logo determination module 113 may comprise a first image data processing model 115, a second image data processing model 119, and/or an Optical Character Recognition module 121, as discussed in more detail below.

The computing device 140 comprises a user interface 142 arranged to receive requests from user(s) and for providing output to the user. The user interface 142 may comprise one or more user interface components, such as one or more of a display device, a touch screen display, a keyboard, a mouse, a camera, a microphone, buttons, for example.

The computing device 140 comprises at least one processor 144, memory 146 and the user interface 142. Memory 146 may comprise program code, which when executed by the processor(s) 144, causes the computing device 140 to perform the described functionality. For example, memory 146 may comprise an entity information client application 147. The entity information client application 147 may provide functionality to a user of the computing device 140, providing an interface with the entity attribute server 102 and/or the entity related records in the database 122, for example.

The entity information client application 147 may be configured to send requests or instructions to the entity attribute server 102 and receive results or output based on the requests. Such requests may be received via the user interface 142 from the user. The entity information client application 147 may be an application accessible through an internet browser or in embodiments where the computing device 140 is a smart phone, the entity information client application 147 may be deployed on the computing device 140 as a smartphone application such as an Android™ or an iPhone™ application, for example.

The computing device 140 further comprises a network interface 148 to facilitate communications with components of the system 100 across the communications network 120, such as the database 122, and/or the entity attribute server 102. The network interface 148 may comprise a combination of network interface hardware and network interface software suitable for establishing, maintaining and facilitating communication over a relevant communication channel.

Figure 2:
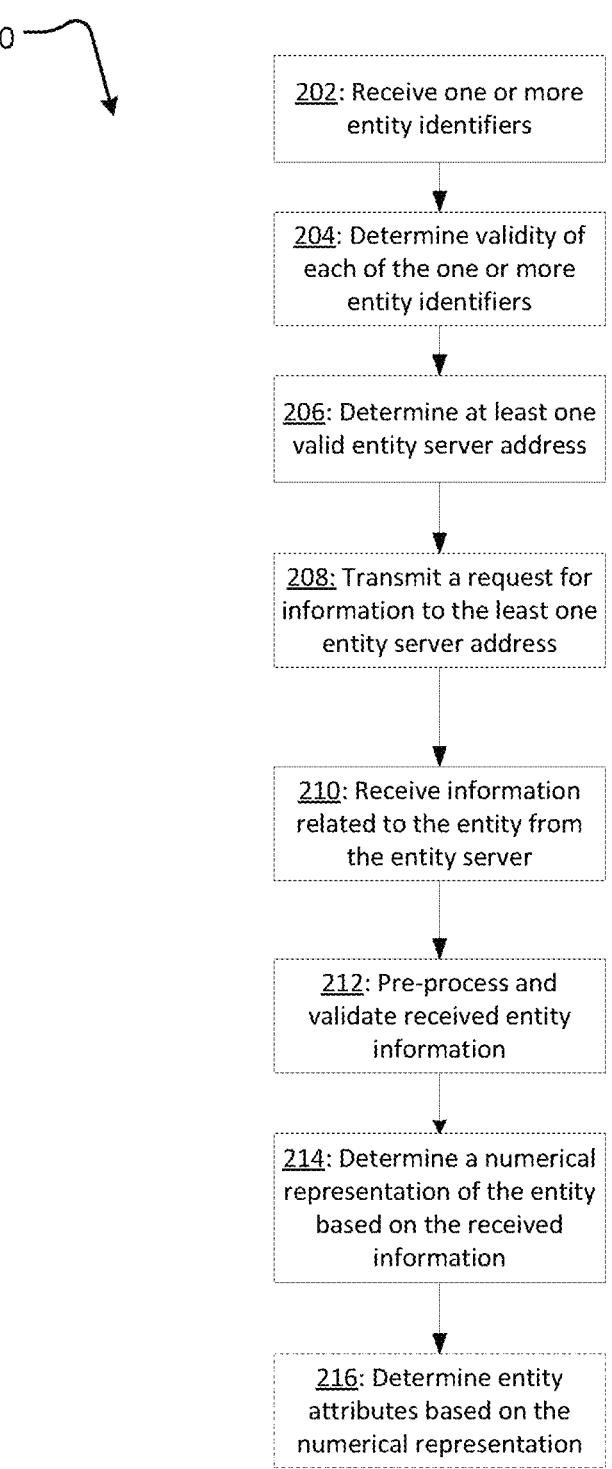
FIG. 2 is a process flow diagram of a computer-implemented method of processing entity information according to some embodiments.

Referring now to FIG. 2, there is shown a process flow diagram of a computer-implemented method of processing entity information according to some embodiments. The computer-implemented method may be performed by the entity attribute server 102.

At 202, the entity attribute server 102 receives one or more entity identifiers. The entity identifiers may be received via user input on a web interface presented to a user by the entity attribute server 102, for example, on the user interface 142 of the computing device 140. In some embodiments, the entity identifiers may be received by the entity attribute server 102 from the database 122 over the network 120. Entity identifiers may comprise an email address, (for such as an email address of an employee) a business or entity name and/or a URL of an entity. Entity identifiers serve as data elements to refer to or uniquely identify an entity.

At 204, validity of the received entity identifiers is determined by the entity identifier validation model 108. The entity identifier validation model 108 may process each of the entity identifiers to determine a validity of each of the identifiers. For example, if an entity identifier is an email address, then the entity identifier validation model may extract a domain name from the email address and verify the domain name by sending a message (pinging) to the domain name and checking if a valid response is obtained. If an invalid response or no response is obtained from the domain, then the entity identifier validation model 108 may determine that the email address is invalid. The method of validation of an entity identifier may vary based on the nature of the entity identifier and in some embodiments, the entity identifier validation model 108 may comprise a decision tree to select an appropriate method of validation based on the nature of the entity identifier. In some embodiments, the entity identifier validation model 108 validates that the domain name is indicative of, or belongs to, a particular organisation type, such as a business. The entity identifier validation model 108 processes each received entity identifier to generate an indicator or flag indicating the validity of each of the received entity identifiers.

At 206, based on the validated one or more entity identifiers, at least one valid entity server address is determined by the entity server address determination module 110. The entity server address determination module 110 may only consider the validated one or more entity identifiers to avoid erroneous results. The at least one valid entity server address may comprise a domain name or an IP address that points to an entity server 124. The at least one valid entity server address enables transmission of requests to the entity server 124.

At 208, the information extraction module 112 transmits a request to the entity server 124 based on the at least one valid entity server address. The request may comprise a request for information that is available from the entity server 124. In some embodiments, the entity server 124 may be a web server hosting one or more web pages. The request transmitted at 208 may comprise a request for content of the one or more web pages hosted on the entity server 124. In some embodiments, the request transmitted at 208 may comprise a request for a sitemap of the web server hosted on the entity server 124. The sitemap may comprise a structure or web links to the various parts of the web site hosted on the entity server 124. The information extraction module 112 may transmit further requests to the entity server 124 based on the structure or web links comprised in the received sitemap. The information extraction module 112 may manage log records of information extracted from an entity server 124 and a time stamp at which information was extracted. The log records and time stamps may assist the information extraction module 112 in determining changes to entity information 130 over time. In some embodiments wherein information from the entity server 124 may be extracted iteratively, the log records and time stamps may assist the information extraction module 112 in limiting information extraction to new entity information 130 previously not extracted by the information extraction module 112.

At 210, in response to the request transmitted at step 208, the entity server 124 may transmit entity information 130 to the entity attribute server 102 over the network 120. The entity information 130 may comprise web content in response to the request at 208. The web content may comprise web pages, text, images, and/or media files such as videos or audio, for example. In some embodiments, with more than one entity servers 124, entity information 130 may be received from each of the entity servers 124. In some embodiments, the entity information comprises one or more logos, which may, for example, be determined from images and image metadata received from the entity server 124.

At 212, the entity information received at 210 is validated by entity information validation module 114. Validation may comprise disregarding information not related to the entity in question, or disregarding information that prima facie appears irrelevant. Validation may also comprise deduplication of entity information 130. For example, if an entity server 124 is a web server that is merely a holding space or undeveloped, such as an "Under Construction" website, then the information validation module 114 may determine that the content on the entity server 124 may not be valid or accurate and it is accordingly disregarded.

At 214, the validated entity information 130 is processed by the entity attribute prediction module 116 to generate a numerical representation of the entity based on the entity information. The entity attribute prediction module 116 may comprise one or more trained neural networks that are trained to process entity information, including text and/or images obtained from a web page on the entity server 124 to generate a numerical representation that embodies or summarises the information obtained from the entity server 124. The numerical representation may be capable of providing a basis for making specific predictions regarding the entity based on the processed entity information 130. In some embodiments, the entity attribute prediction module 116 is configured to generate numerical representations according to the process described with reference to FIG. 7 below.

At 216, based on the numerical representation or model generated at 214, the entity attribute prediction module 116 may make predictions regarding an entity attribute. Examples of entity attributes may include: number of employees of the entity, an industry classification or a label for the entity, category of goods or services offered by the entity, one or more physical locations or addresses associated with the entity. The determined entity attributes may be useful in providing more directed or tailored services to the entity. For example, if the entity is deemed to have a large number of employees, then automated payroll services may be offered to the entity based on the predicted entity attribute. In some embodiments, 216 may involve predicting or extracting names of employees and job titles of each employee of an entity based on the numerical representation or model of the entity.

The table below lists further examples of entity attributes that may be predicted by the entity attribute prediction module 116.

| Entity Attribute Name | Entity Attribute Description |
| --- | --- |
| google_analytics | Entity's Website uses Google analytics |
| facebook_pixel | Entity's Website uses Facebook tracking |
| twitter_analytics | Entity's Website uses twitter analytics |
| marketo | Entity's Website uses Marketo |
| copyright | Entity's Website has "copyright" on it |
| tech_startup_domain | Entity's url is .io or .ai. |
| cms_drupal | Entity's Website uses Drupal |
| cms_jimdo | Entity's Website uses Jimdo |
| cms_joomla | Entity's Website uses Joomla |
| cms_magento | Entity's Website uses Magneto |
| cms_mailchimp | Entity's Website uses Mailchimp |
| cms_silverstripe | Entity's Website uses Silverstipe |
| cms_squarespace | Entity's Website uses Squarespace |
| cms_virtuemart | Entity's Website uses Virtuemart |
| cms_weebly | Entity's Website uses Weebly |
| cms_wix | Entity's Website uses Wix |
| cms_wordpress | Entity's Website uses Wordpress |
| cms_xampp | Entity's Website uses Xampp |
| cms_yoast | Entity's Website uses Yoast |
| uses_cms_platform | Entity's Website uses a CMS platform |
| ecommerce_woocommerce | Entity's Website uses Woocommerce |
| ecommerce_shopify | Entity's Website uses Shopify |
| ecommerce_bigcommerce | Entity's Website uses BigCommerce |
| ecommerce_volusion | Entity's Website uses Volusion |
| ecommerce_bigcartel | Entity's Website uses Big Cartel |
| ecommerce_3dcart | Entity's Website uses 3dcart |
| ecommerce_tradevine | Entity's Website uses Tradevine |
| ecommerce_opencart | Entity's Website uses Opencart |
| ecommerce_etsy | Entity's Website uses etsy |
| ecommerce_trademe | Entity's Website uses Trademe |
| ecommerce_ebay | Entity's Website uses eBay |
| ecommerce_amazon | Entity's Website uses Amazon |
| uses_ecommerce_platform | Entity's Website uses a web commerce system |
| family_owned | Entity Likely to be family owned or operated |
| forbidden | Entity's Website was forbidden to access |
| general_shop | Entity Likely to have physical store |
| hiring | Entity Likely to be hiring |
| detected_job_titles | List of job titles on Entity's website |
| keywords | List of keywords on Entity's website |
| has_keywords | Entity's Website HTML has keywords tag |
| largest_date | Latest date detected on the Entity's website |
| n_script_tags | Number of script tags that the Entity's website has |
| online_shop | Entity Likely to have online shop |
| payment_stripe | Entity's Website uses Stripe |
| payment_paypal | Entity's Website uses Paypal |
| has_payment | Entity's Website uses a payment system |
| robot_meta_tag | Entity's Website has a robots tag |
| has_social | Entity's Website has social media links |
| has_investor_exec | Entity's Website mentions investors or executives |
| has_offices | Multiple office locations displayed for the entity |
| has_opening_hours | Opening hours are listed on Entity's website. |
| has_team | Entity's Website has a team mentioned |
| has_facebook | Entity's Website has Facebook link |
| has_google_plus | Entity's Website has Google Plus link |
| has_instagram | Entity's Website has Instagram link |
| has_linkedin | Entity's Website has LinkedIn link |
| has_pinterest | Entity's Website has Pinterest link |
| has_snapchat | Entity's Website has Snapchat link |
| has_twitter | Entity's Website has Twitter link |
| has_youtube | Entity's Website has YouTube link |
| has_react | Entity's Website uses React |

-continued

| Entity Attribute Name | Entity Attribute Description |
| --- | --- |
| has_angular | Entity's Website uses Angular |
| has_ruby | Entity's Website uses Ruby |
| has_ajax | Entity's Website uses Ajax |
| has_bootstrap | Entity's Website uses Bootstrap |
| has_php | Entity's Website uses PHP |
| has_cloudflare | Entity's Website uses Cloudflare |
| has_async | Entity's Website uses async |
| model_version | Version number of model used to make predictions |
| embedding | Numerical representation of the entity |
| industry | Most likely Industry the entity operates in |
| Industry_score | Confidence score associated with the predicted Industry |
| sole_trader | Entity Likely to be a sole trader |
| sole_trader_score | Confidence score associated with the sole_trader prediction |
| tech_savvy | Entity Likely to be tech savvy |
| tech_savvy_score | Confidence score associated with the tech_savvy prediction |
| location | All locations found |
| location_scores | Number of locations |
| Industry_classification | Most likely category or class or industry that an entity operates in |
| address | Most likely address of the entity |
| address_components | Most likely Country, City, Street, Number of the entity |
| latitude | Latitude of the entity's most likely location |
| longitude | Longitude of the entity's most likely location |

The text below is an example of some text in entity information 130 analysed by the entity attribute prediction module 116 to predict entity attributes:

"From small beginnings in retaining walls, hillside excavation and rock breaking, Entity Name has significantly expanded its expertise to include residential and commercial deconstruction, demolition, civil construction, site development, civil infrastructure and roading. We enjoy working on projects of all sizes—from development of large subdivision sites and civil infrastructure to completing the new driveway for your home. We also love a challenge and have built a reputation for taking on projects that other companies won't or don't. Whether poor access, steep slopes or hillside locations, we work closely with clients to identify and solve any issues that may arise during excavation and construction while remaining true to the objectives of the project. Like all companies, clients are key to our success. We focus on fully understanding your requirements so we can provide you with solutions that are timely, innovative, within budget and add value to your project. Health and safety and environmental responsibility are paramount. We aim to eliminate any conditions on our work sites that could affect the health and safety of our clients, employees, business partners and the general public. We also work to minimise any detrimental effects the project activities may have on the environment. Communication and regular reviews combined with comprehensive project management skills ensure you are kept up to date on progress and results. Our hands-on approach enables us to complete projects without added complexity and cost to you."

The text below illustrates some examples of some entity attribute predictions and associated scores determined by processing in-part the above text:

{'industry': [{'class': 'Engineering Consulting', 'score': 0.9962305427}, {'class': 'Consulting', 'score': 0.0010741727}, {'class': 'Management and Related Consulting Services', 'score': 0.0008346763}, {'class': 'Waste Management Services', 'score': 0.0005396337}, {'class': 'Employment Placement & Recruitment Services', 'score': 0.00023634910000000002}],
'tech_savvy': [{'class': 'tech_savvy', 'score': 0.6581801176000001}, {'class': 'not_tech_savvy', 'score': 0.34181994200000004}],
'sole_trader': [{'class': 'not_sole_trader', 'score': 0.9752851725}, {'class': 'sole_trader', 'score': 0.0247148797}]}

In the above entity attribute prediction output, an industry classification of 'Engineering Consulting' has been determined to have a probability score of 0.9962305427. Based on this determined probability score, the relevant entity is predicted to most likely be in the industry category of Engineering Consulting. Similarly, a score of 0.9752851725 has been determined for the classification of 'not_sole_trader'. Accordingly, the relevant entity may most likely not relate to a sole trader's practice.

In some embodiments, the entity attributes that may be predicted by the entity attribute prediction module 116 may further include a category or a class identifier associated with each webpage extracted from entity information 130. The predicted category or a class identifiers may include: home, about us, contact us, team, careers, for example.

In embodiments where the entity information comprises images and image metadata, the logo determination module 113 of the entity attribute server 102 may determine one or more logos associated with the entity as described in more detail with reference to FIG. 4 below.

Figure 3:
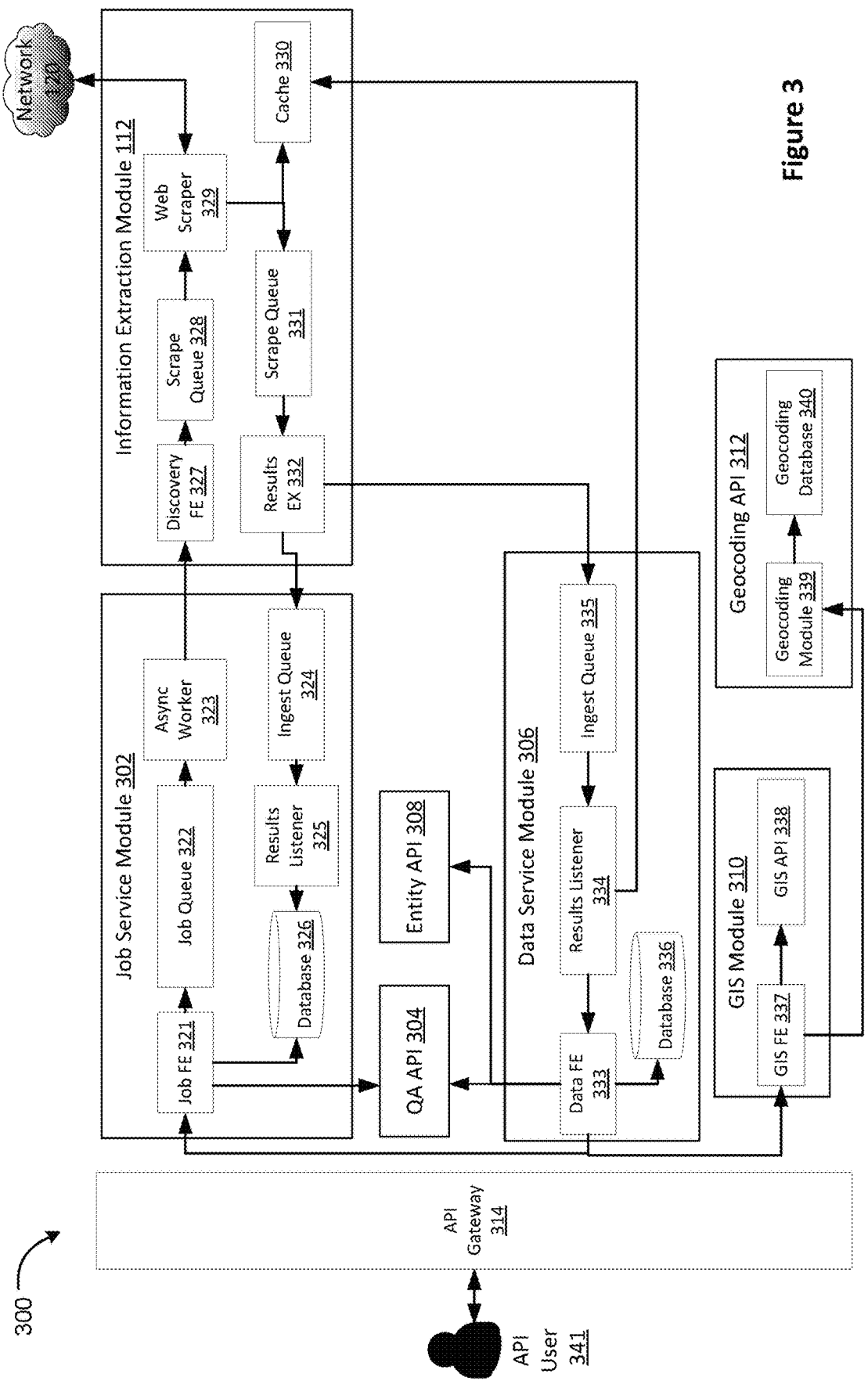
FIG. 3 is a block diagram of a system for processing entity information, according to some embodiments.

FIG. 3 is a schematic diagram 300 of some components of the entity attribute server 102 for determining entity attributes according to some embodiments.

The information extraction module 112 may comprise one or more web scraping modules 329. Each web scraping module 329 may execute a separate computing thread or process corresponding to an information scrape of a particular system or entity server 124. Each web scraping process may operate in parallel to obtain entity information 130 from multiple entity servers 124 in parallel. The information extraction module 112 may also comprise one or more web scraping queues 328, 331. Each web scraping queue 328, 331 may manage a pipeline or queue of requests to be executed by a web scraping module 329 or results obtained from a web scraping module 329. The information extraction module 112 may comprise a discovery feeding engine 327 configured to receive and process requests regarding information extraction from a new entity server 124. The information extraction module 112 may comprise a results export module 332 configured to collate results obtained by web scraping and transmit the collated results to an ingest queue module 324 of a job service module 302 and/or an ingest queue module 335 of a data service module 335.

The job service module 302 may manage a sequence of requests to the information extraction module 112. The job service module 302 may also manage a sequence of response from the information extraction module 112. The job service module 302 may also comprise a database 326 to temporarily store the information extracted by the information extraction module 112 for pre-processing. The job service module 302 may comprise a job feeding engine 321 configured to prepare a new request for extraction of information from the entity attribute server 102. Requests prepared by the job feeding engine 321 may be placed in a job queue 322 and the requests may be processed or triggered by an asynchronous worker module 323. Results of information extraction received in the ingest queue 324 may trigger the results listener 325 to process and store the received results in database 326. The entity attribute server 102 may also comprise a Quality Assurance API 304 that enables checking the quality or validity of the extracted entity information 130.

In some embodiments, the entity attribute server 102 may comprise a data service module 306. The data service module 306 may comprise a result ingestion queue 335 which may feed results or extracted entity information 130 to a results listener 334. The results listener 334 via a data feeding engine 333 may make the extracted entity information accessible via an API gateway 314 to other computer systems or other modules within the entity attribute server 102 or API users 341 that may process the extracted entity information. In some embodiments, the entity attribute server 102 may also comprise an entity API 308. The entity API 308 may process requests for entity information received through the API gateway 314.

In some embodiments, the entity attribute server 102 may also comprise a geographical information service (GIS) module 310. The geographical information service module 310 may enable determination of geographical information such as location based on extracted entity information 103. The geographical information service module 310 may be a part of the entity attribute prediction module 116. The GIS module 310 may comprise a GIS feeding engine 337 configured to receive requests from the data feeding engine 333 and transmit the received requests to a GIS API 338 and a Geocoding Module 339.

The geographical information service module 310 may be arranged to communicate with a geocoding API module 312 to extract further information regarding geographical locations. For example, the geocoding API module 312 may enable the extraction of geographical coordinates based on an address obtained from extracted entity information 130. The geocoding API module 312 may comprise a geocoding database 340 storing information regarding geographical locations and geographical coordinate information.

Referring now to FIG. 4, there is shown a process flow diagram 400 of a computer-implemented method of processing entity information to determine an entity logo according to some embodiments. The computer-implemented method may be performed by the logo determination module 113 of the entity attribute server 102.

At 402, the entity attribute server 102 determines one or more candidate logo images provided in the entity information 130. In some embodiments, the entity attribute server 102 may also determine respective image metadata associated with candidate logo image(s) provided in the entity information 130.

The candidate logo image(s) and respective image metadata may be obtained by the information extraction module 112 from a website served by the entity server 124, for example. In some embodiments, the candidate logo image(s)

and respective image metadata may be obtained from the entity information records 152 in the database 122. The image metadata may include one or more of: image file-name, image file path on the entity server 124, one or more HTML tags associated with the image, for example.

At 404, the entity attribute server 102 determines a feature vector corresponding to each candidate image determined at 402 is generated. The feature vector may be generated by encoding information in the candidate logo image(s) and/or respective image metadata using text and/or image parsing operations.

In some embodiments, the feature vector may be determined by assessing various aspects regarding the image metadata, for example:

Whether the file name or file path corresponding to the candidate logo image comprises the word 'logo'

Whether the file name corresponding to the candidate logo image comprises the entity name.

Whether one or more HTML tags associated with the candidate logo image comprises the word 'logo'

An indication or metric corresponding to the degree to which the entity's name is comprised in the file name of the candidate logo image or one or more HTML tags associated with the candidate logo image At 406, the feature vector obtained for the candidate logo image at 404 may be processed by the first image data processing model 115 to determine a first image score. The first image data processing model 115 may comprise a first weights to coefficients vector corresponding to each feature determined at 404. The first image data processing model 115 may process the features determined at 404 by performing a dot product with the weight vector to determine the first image score. In some embodiments, the first image data processing model 115 may also apply a sigmoid function to the first image score to transform the first image score into a number between 0 and 1. A higher first image score may indicate a greater likelihood of the candidate image being a designated logo of an entity.

At 408, the logo determination module 113 may determine a subset of the candidate logo images based on the first image score and a predetermined first threshold for the first image score. Since an entity server 124 may have a large number of images, determining a subset of candidate logo images based on the first image score may reduce the number of candidate logo images to be processed by the rest of the process of the method of FIG. 4, and may provide improved computational efficiency by disregarding candidate logo images unlikely to be a designated logo of an entity. In some embodiments, step 408 may be optional and the rest of the steps of the method of FIG. 4 may be performed for each candidate logo image determined at step 402.

At 410, each candidate logo image determined at step 402, or each candidate logo image of the subset determined at 408, may be processed by the optical character recognition (OCR) module 121 to determine any text present in the candidate logo image. In some embodiments, the character recognition operation may be performed using the cloud based Amazon Rekognition service.

At 412, the logo determination module 113 may determine a similarity metric indicative of the similarity between the candidate logo text determined at 410 and the entity name. The similarity metric may indicate the degree to which the entity name or part of the entity name is embedded in the candidate logo text determined at 410. The similarity metric may be determined based on a Jaccard similarity metric, or a cosine similarity metric, or a Euclidean distance metric, for example.

At 414, the similarity metric determined at 412 and the feature vector determined at 404 may be provided as an input to the second image data processing model 119 to determine a logo probability score for each candidate logo image. The second image data processing model 119 may comprise a second weights or coefficient vector corresponding to each feature determined at 404 and the similarity metric determined at 412. The second image data processing model 119 may process the features determined at 404 and the similarity metric determined at 412 by performing dot product operation and applying a sigmoid function to the result to obtain the logo probability score for each candidate logo image as a number between 0 and 1.

At 416, the logo determination module 113 may determine or designate a candidate logo image as an entity logo based on the logo probability score determined at 414. In some embodiments, a candidate logo image with the highest determined logo probability may be designated as an entity logo. The determined logo probability scores and the candidate logo images may be stored in the database 122. The determined logo probability scores and the candidate logo images may be transmitted to the computing device 140 as a set of recommendations and associated scores with the recommendations. The determined logo probability scores and the candidate logo images may be presented to a user using the user interface 142 for feedback from the user regarding the determined logo probability scores, for example. In some embodiments, the designated entity logo may be provided as part of search results generated by the entity search module 117.

The values within the first and second weight vectors may be determined using a training dataset comprising several candidate logo images extracted from an entity server 124 and a known entity logo within the extracted candidate logo images. The weight vectors may be determined using logistic regression techniques when applied to the training dataset.

Referring now to FIG. 5, there is shown a process flow diagram 500 of a computer-implemented method 500 of performing an entity search operation based on numerical representations of entities. The computer-implemented method 500 may be performed by the entity attribute server 102, and may, for example, use the entity numerical representation records 154 from the database 122.

At 502, the entity attribute server 102 determines a numerical representation of entity data for each of a plurality of entities. In some embodiments, this may comprise processing the entity information 130 from the entity server 124 for each of the plurality of entities by the entity attribute prediction model. In other embodiments, the entity attribute server 102 may extract or determine the entity numerical representation records 154 from the database 122. In some embodiments, the entity attribute server 102 may generate the numerical representations according to the process described with reference to FIG. 2 and/or FIG. 7.

At 504, the entity attribute server 102, and in some embodiments, the entity search model 117, receives an entity search text, for example, from the computing device 140. The entity search text may comprise one word, or a series of words or a sentence, for example.

At 506, the entity attribute prediction module 116 processes the search text to generate a query numerical representation. The query numerical representation may encode the semantic information present in the search text in the form of a vector. In some embodiments, the entity attribute server 102 may generate the query numerical representation according to the process described with reference to FIG. 7.

At 508, the entity search model 117 performs a comparison between the query numerical representation and each of the numerical representations of the plurality of entities determined at 502. In some embodiments, the entity search model 117 performs a matrix multiplication operation between the query numerical representation and a matrix of the numerical representations of the plurality of entities determined at 502. The result of a comparison may be a similarity score indicating a degree of semantic similarity between the entity search text and the entity information 130 as encoded in each of the numerical representations of the plurality of entities.

At 510, based on the similarity scores determined at 508, the entity search model 117 may determine an entity most relevant to the entity search text. In some embodiments, the entity search model 117 determines a ranked list of most relevant entities based on the similarity scores determined at 508.

At 512, the determined most relevant entity or the determined ranked order of relevant entities and the respective similarity scores may be transmitted to the client device 140. The search results generated by the method of FIG. 5 may provide more relevant results in comparison to results provided by a conventional keyword based search. The search results generated by the method of FIG. 5 are generated based on the large volume of data in the entity information 130 encoded succinctly in the entity numerical representation records 154.

As an example of an entity search operation, based on an entity search text for 'solar', the entity search model 117 may generate the following search results and scores:

[{'distance': 0.826666432423432 , 'url': 'http://powercomgroup.com'},
{'distance': 0.801232189008032 , 'url': 'http://skylightenergy.com.au'},
{'distance': 0.783902193219312 , 'url': 'http://nzsolar.co.nz'},
{'distance': 0.773213123213213 , 'url': 'http://comparesolar.co.uk'},
{'distance': 0.760900900132132 , 'url': 'http://azsunservices.com'}]

As illustrated in the search results above, the distance values indicate a distance or similarity metric between the entity search text and the entity information 130 extracted from the respective URL (entity identifier). The URL http://powercomgroup.com has the highest distance or similarity metric and accordingly the URL http://powercomgroup.com is determined to be the most similar search result for the entity search text 'solar'.

Referring now to FIG. 6, there is shown a process flow diagram of a computer-implemented method 600 of performing clustering of entity numerical representations. In some embodiments, the clustering of entity numerical representations may allow determination of distinct classes of entities, each distinct class being associated with a particular identified cluster. The determined distinct classes of entities may also allow the classification of entities based on the determined entity numerical representation. The computer-implemented method 600 may be performed by the entity attribute server 102, and may, for example, use the entity numerical representation records 154 from the database 122.

At 602, the entity attribute server 102 determines a numerical representation for each of a plurality of entities. In some embodiments, this may comprise processing the entity information 130 from the entity server 124 for each of the plurality of entities by the entity attribute prediction model

116. In other embodiments, the entity attribute server 102 extracts or determines the entity numerical representation records 154 from the database 122. In some embodiments, the entity attribute server 102 may generate the numerical representations according to the process described with reference to FIG. 2 and/or FIG. 7.

At 604, the entity numerical representations determined at 602 are processed by the clustering module 109 to identify one or more clusters within the plurality of numerical representations. Each identified cluster may relate to one or more entities sharing common or similar attributes as derived from their respective entity information 130. The clustering module 109 may implement clustering using k-means clustering, or mean shift clustering, or hierarchical clustering, or distribution based clustering, or density based clustering techniques. Each identified cluster may be provided a unique cluster identifier value.

Figure 10:
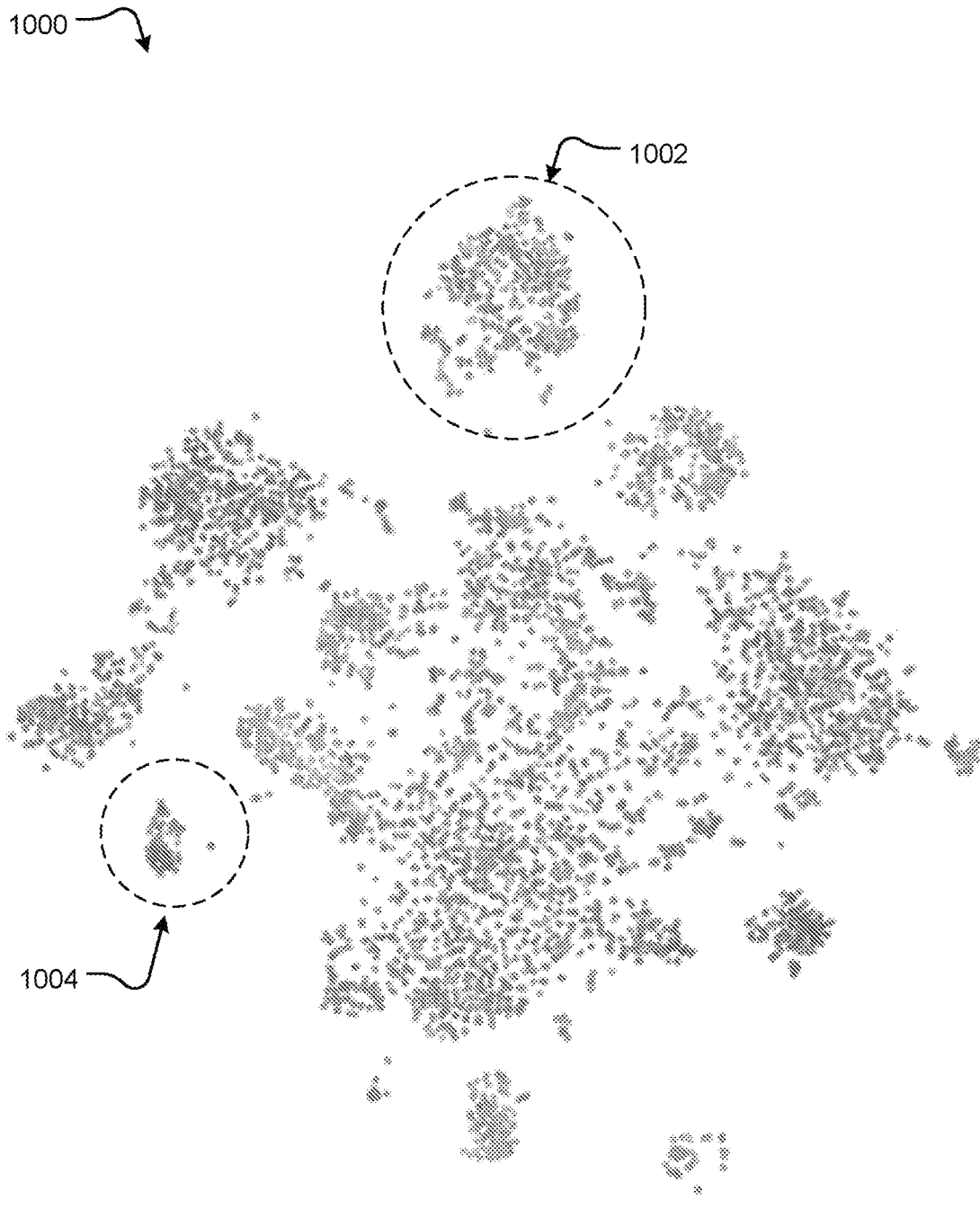
FIG. 10 is an example entity clustering infographic generated according to some embodiments.

At 606, based on the clusters identified at 604, a cluster visualisation infographics may be determined by the clustering module 109. The cluster visualisation infographics may visually represent the clusters identified at 606 to provide an intuitive visualisation of the identified clusters. In some embodiments, the cluster visualisation infographic may comprise a scatter plot. Each dot in the scatter plot may relate to an entity or a numerical representation of an entity and the relative position of the dots may be used to indicate the identified clusters. FIG. 10 illustrates an example cluster visualisation infographic that may be generated at 606 by the clustering module 109.

At 608, the cluster visualisation generated at 606 is transmitted to the computing device 140 where it may be displayed via a user interface 142. The generated cluster visualisation infographic may provide a succinct representation of a significant volume of data obtained from entity information 130 of a plurality of entities that is more readily suited to visual analysis.

Figure 7:
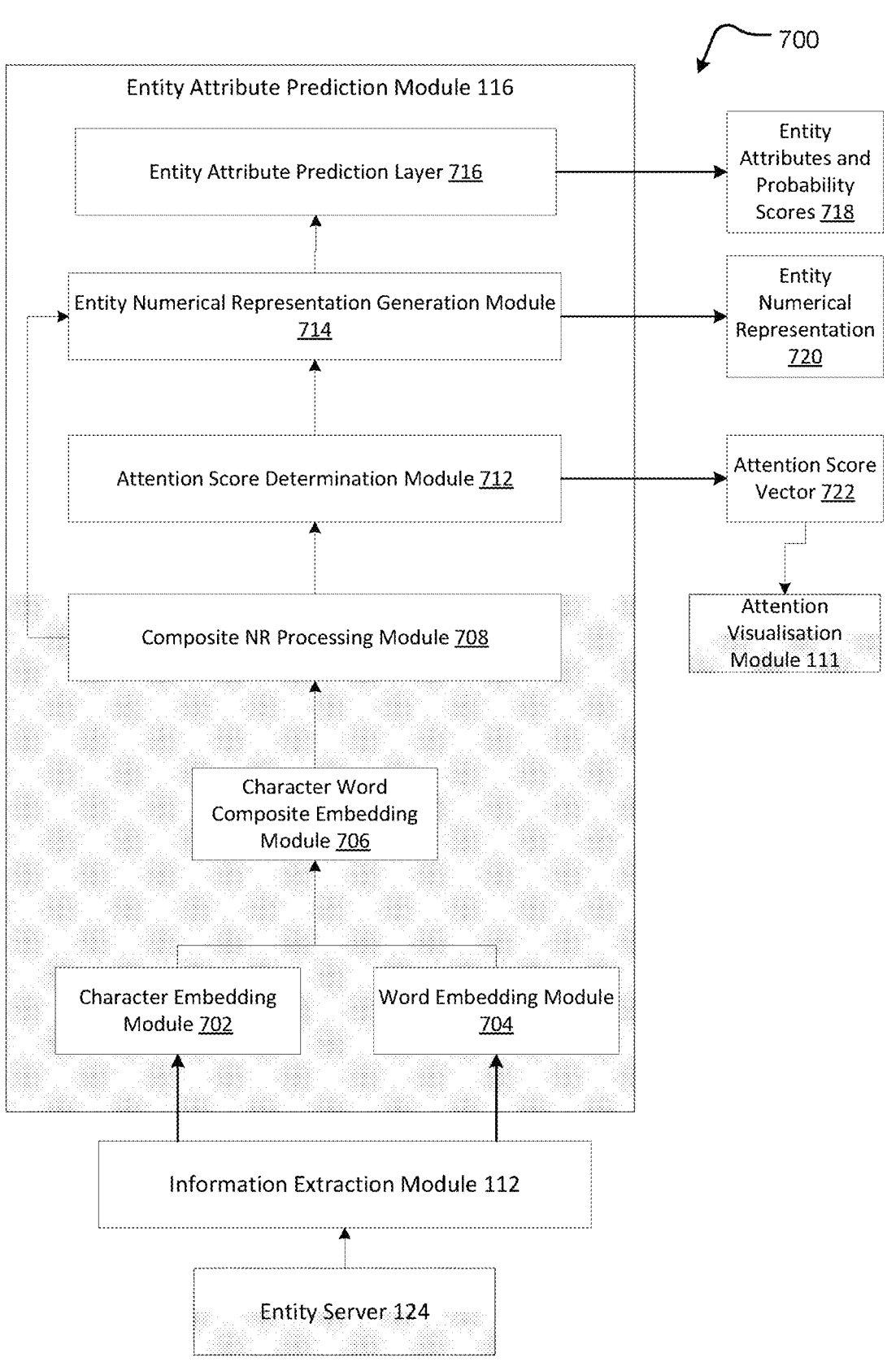
FIG. 7 illustrates various internal components/modules of an entity attribute prediction module of the system of FIG. 1, according to some embodiments.

Referring now to FIG. 7, there is shown a schematic or block diagram 700 including various internal components/modules of the entity attribute prediction module 116 used to generate numerical representations and derive inferences, according to some embodiments.

The entity attribute prediction module 116 is configured to receive input from the information extraction module 112. The information extraction module 112 may extract entity information 130 from the entity server 124. In some embodiments, the entity attribute prediction module 116 may receive input from the database 122 that may store a copy of the entity information 130. Input to the entity attribute prediction module 116 may be in the form of a series of text within the entity information 130. The series of text may comprise a series of text obtained from a website relating to a particular entity, for example.

A character embedding module 702 or neural network layer(s) of the entity attribute prediction module 116 generates a numerical representation of each character in a series of text provided as an input to the entity attribute prediction module 116. The numerical representation for each character may take into account the context in which the character is present in the series of text received as input by the entity attribute prediction module 116. In some embodiments, the character embedding module 702 may comprise an embedding matrix that may be randomly initialised and trained as part of the training process of the entity attribute prediction module 116. In some embodiments, the character embedding module 702 may also comprise one or more neural network layers implementing a Gated Recurrent Unit (GRU) as previously described.

A word embedding module 704 or neural network layer(s) of the entity attribute prediction module 116 generates a numerical representation of each word in the series of text provided as an input to the entity attribute prediction module 116. In some embodiments, the word embedding module 704 may comprise a pre-trained word numerical representation generation module, for example a Glo Ve: Global Vectors for Word Representation based numerical representation generation module or a Word2Vec based numerical representation generation module.

The numerical representations generated by the character embedding module 702 and the word embedding module 704 may be processed by a character-word composite embedding module 706 of the entity attribute prediction module 116 to generate a composite numerical representation of each word. The character-word composite embedding module 706 may combine the numerical representation of the word obtained from the word embedding module 704 with the numerical representation for each character in the word as obtained from the character embedding module 702. The combination operation may comprise a concatenation operation.

The composite numerical representation generated by the character-word composite embedding module 706 may be provided as an input to a composite numerical representation processing module or neural network layer(s) 708. The composite numerical representation processing layer 708 may comprise a definition of weights and mathematical operations to process the composite numerical representations generated by the character-word composite embedding module 706 as an intermediate step in generation of the entity numerical representation 720. The operations to the composite numerical representations enable the transformation of the text information extracted from the entity server 124 to a numerical representation 720 indicative of, or corresponding to, the entity. In some embodiments, the composite numerical representation processing layer 708 may comprise a bi-directional RNN such as a bi-directional GRU. The bi-directional RNN/GRU comprises a forward (left to right) layer of neurons to process a series of text in the sequence in which they appear in the text extracted from entity information 130. The bi-directional RNN/GRU also comprises a backward (right to left) layer of neurons to process a series of text in the inverse sequence in which they appear in the text extracted from entity information 130. By considering the composite numerical representations of text or words from entity information in both the forward and backward sequence, the composite numerical representation processing layer 708 in processing information takes context in both forward and backward order into account. After each iteration, output generated by the backward and forward layer of neurons may be concatenated. In some embodiments, the entity attribute prediction module 116 may comprise more than one composite numerical representation processing layer, such that the output of each layer is provided as an input to the next layer. Each additional layer may have its own district weights that may be determined as the entity attribute prediction module 116 is trained.

Figures 8A, 8B, 8C:
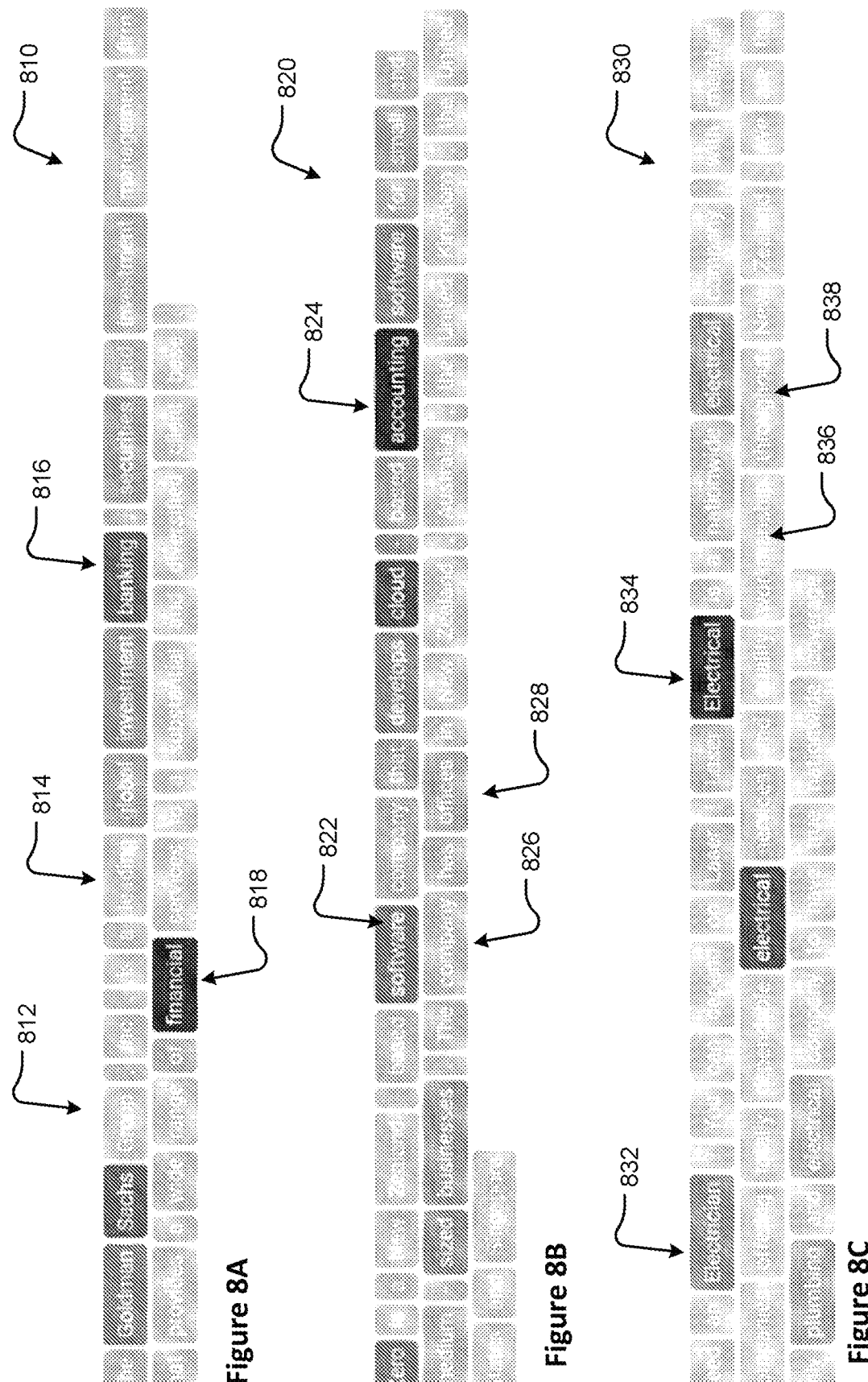
FIGS. 8A, 8B and 8C illustrate an infographic generated based on attention scores associated with words relating to an entity.

The entity attribute prediction module 116 of some embodiments may also comprise an attention score determination module 712. The attention score determination module 712 may generate attention scores for each word provided as input to the entity attribute prediction module 116. The attention score may indicate a significance or relevance of a word to the entity as illustrated in FIGS. 8A, 8B and 8C. In some embodiments, the entity attribute prediction module 116 may generate the attention scores based on the residual connection or weights within the one or more composite numerical representation processing layers 708. The attention scores may provide a perceivable explanation of the entity numerical representation 720 and may allow troubleshooting of the training process and improvement of the training data. Depending on the nature of tasks performed by the entity attribute prediction module 116, the attention score determination module 712 may be excluded from the entity attribute prediction module 116. For example, for an entity attribute prediction module 116 configured to perform sequence tagging operations, the attention score determination module 712 may not be necessary to perform the sequence tagging operation.

The entity attribute prediction module 116 comprises an entity numerical representation generation module 714 that receives, as input, the output of or more composite numerical representation processing layers 708 and the output of the attention score determination module 712. Based on this input the entity numerical representation generation module 714 performs dimensionality reduction operations to generate a dimensionally reduced numerical representation 720 for an entity based on the entity information 130 extracted from the entity server 124. In some embodiments, the numerical representation 720 may comprise a vector of 32, 64, 128 or 256 dimensions, for example.

In some embodiments, the dimensionality reduction operations of the entity numerical representation generation module 714 may be guided by explicit targets defined for the entity attribute prediction module 716. The explicit targets may comprise predefined classes of entities associated with an entity class or an entity industry attribute. End to end training of the entire entity attribute prediction module 116 based on the explicit targets for the entity attributes may guide the entity numerical representation generation module 714 towards learning accurate entity numerical entity attribute representations. The table below is an example of target entity attribute values for an entity industry attribute according to some embodiments:

| Agriculture, Forestry and Fishing | Mining | Manufacturing |
|---|---|---|
| Electricity, Gas, Water and Waste Services | Construction | Wholesale Trade |
| Retail Trade | Accomodation and Food Services | Transport, Postal and Warehousing |
| Information Media and Telecommunications | Financial and Insurance Services | Rental, Hiring and Real Estate Services |
| Professional, Scientific and Technical Services | Administrative and Support Services | Public Administration and Safety |
| Education and Training | Health Care and Social Assistance | Arts and Recreation Services |

The entity attribute prediction module 116 comprises at least one entity attribute prediction layer 716. Each entity attribute prediction layer 716 may comprise a neural network that may be specifically trained to perform a specific task, such as a classification, sequence tagging, hierarchical classification, transfer learning or a regression task. Each entity attribute prediction layer 716 may generate as output

718, predicted entity attribute value(s) and probability scores associated with the predicted entity values.

The entity attribute prediction module 116 of some embodiments may be configured to perform sequence tagging operations. The sequence tagging operations may include recognition of people or names in entity information 130. Recognition of names may include identification of names of employees within the entity information 130, for example. In some embodiments, the sequence tagging operations may further include a classification operation of the identified sequences.

As an example, training data for a sequence tagging task may include string inputs and corresponding targets/labels corresponding to each string, such as the following tuple: input ["John is the managing director."], and target/label ["B-Person", "O", "O", "O", "O", "O"]. In this example training data tuple, each token in the input string is associated with a corresponding target tag (including punctuation). In addition, in this example, tag names include either a B- or I- at the start to indicate whether the tag is for the beginning of the entity type, or an inner/end component.

Once initialised and trained, the entity attribute prediction module 116 may be used to predict names/people within entity information 130. For instance, for an input entity information 130 with the text 'Bob Smith started the company in 2015', the entity attribute prediction module may identify as an output [{name: 'Bob Smith', class: 'Founder', score: '0.978812'}]. The name value may indicate the name within the identified sequence, the class value may indicate the class or category of the identified sequence and the score value may indicate a confidence level of the prediction.

In some embodiments, the entity attribute prediction module 116 may perform entity attribute prediction based on transfer learning. Transfer learning may allow the entity attribute prediction module 116 to be reused as a starting point for a new task, such as a new classification or regression operation. For example, a new classification task of categorizing an entity into a new set of classes or categories may be performed by using the pre-trained entity attribute prediction module 116 and adding to the model the new classification task. Use of transfer learning may allow effective training for the new task without the need of a Graphics Processing Unit (GPU) for the training.

For example, a transfer learning task could include a text classification task, such as detecting whether some text is about sport, literature or science. The pre-trained entity attribute prediction module 116 could be selected and loaded, and trained on this new task using a training dataset for the new classification task. For example, training data for the new classification task could be in the form of the following ([input data] [target data (or label data)]) tuple:
  (['Tennis Statistics By Sets and Games',
    'Why is Russia considered a tricky destination for European football cup ties?',
    "What does the term it's a fast track mean in regards to the long jump track?",
    'Will penalty runs be awarded if a throw to the stumps hits a helmet?',
    'Looking for a good hybrid kayak']
  ['SPORT', 'SPORT', 'SPORT', 'SPORT', 'SPORT'])
  Advantageously, the transfer learning may allow the entity attribute prediction model 116 to perform new tasks using a smaller amount of training data or a smaller amount of additional training data for the new task.

Once trained on the new classification task, the entity attribute prediction module 116 could be used to classify topics. For instance, in the example above, predicting a classification for "quantum neural networks", results in the module 116 predicting "science" with a high probability, and predicting a classification for "what were the greatest works by voltaire?" results in "literature", as shown below.

```
model.predict(['quantum neural networks'])
[{'subject': [{'class': 'SCIENCE', 'score': 0.9999990463256836},
    {'class': 'SPORT', 'score': 9.4216284196591e-07},
    {'class': 'LITERATURE', 'score': 3.218499102786154e-07}]}]
model.predict(['what were the greatest works by voltaire?'])
[{'subject': [{'class': 'LITERATURE', 'score': 0.5967087745666504},
    {'class': 'SPORT', 'score': 0.3163452446460724},
{'class': 'SCIENCE', 'score': 0.08694583922624588}]}]
```

In some embodiments, the entity attribute prediction layer(s) 716 may be configured to perform hierarchical classification. To perform hierarchical classification, a target set of hierarchical classes may be predefined. The entity attribute prediction layer(s) 716 may comprise one or more layers dedicated to prediction of each hierarchical classification value. For example, the entity attribute prediction layer(s) 716 may be configured to predict hierarchical industry classification values. A level 1 industry classification may include the classes: Construction, Mining, Agriculture, Manufacturing, for example. A level 2 industry classification may include the classes: Construction→Building Construction, Construction→Heavy and Civil Engineering Construction, Mining→Coal Mining, Mining→Metal Ore Mining, for example. Distinct layers of the entity attribute prediction layer(s) 716 trained to predict each level of industry classification values based on entity information 130. In some embodiments, the, some intermediate layers of the entity attribute prediction layer(s) 716 may be shared across all the classification tasks to allow improved accuracy in the classification by shared learning across all the different classification tasks.

The following examples are results of multi-level hierarchical classification based on some test entity information 130 data:

```
Level 1 Classification: 'IT Services and Software Development',
Level 2 Classification: 'Web Based Software Application',
Level 3 Classification: 'Digital Home Technology'}
{Level 1 Classification: 'Property Operators and Real Estate Services',
Level 2 Classification: 'Real Estate Services',
Level 3 Classification: 'Real estate agency service'}
```

In some embodiments, the hierarchical classification determined by the entity attribute prediction module 116 may allow the generation of a text description of an entity.

FIG. 8A illustrates an example infographic 810 generated based on attention scores associated with words relating to an entity. The infographic 810 is generated based on an exemplary text extracted from entity information 130 relating to the banking entity Goldman Sachs. Words more relevant to the entity such as 'banking' word 816, 'financial' word 818 have been identified with a darker shade based on a higher attention score. Words not directly relevant to the nature of the entity such as 'group' word 812 and 'leading' word 814 have been identified with a lighter shade indicating a lower attention score.

FIG. 8B illustrates another example infographic 820 generated based on attention scores associated with words relating to an entity. The infographic 820 is generated based on an exemplary text extracted from entity information 130 relating to the accounting software entity Xero. Words more relevant to the entity such as 'software' word 822, 'accounting' word 824 have been identified with a darker shade based on a higher attention score. Words not directly relevant to the nature of the entity such as 'company' word 826 and 'offices' word 828 have been identified with a lighter shade indicating a lower attention score.

FIG. 8C illustrates another example infographic 830 generated based on attention scores associated with words relating to an entity. The infographic 830 is generated based on an exemplary text extracted from entity information 130 relating to an electrical business. Words more relevant to the entity such as 'electrician' word 832, 'electrical' word 834 have been identified with a darker shade based on a higher attention score. Words not directly relevant to the nature of the entity such as 'workmanship' word 836 and 'throughout' word 838 have been identified with a lighter shade indicating a lower attention score.

FIGS. 8A, 8B, 8C are examples of attention score infographics generated by some embodiments, where attention scores are represented or indicated by a darkness shade associated with a word extracted from entity information 130. In alternative embodiments, the attention score infographics may include actual attention score values associated with words or a representation or indication of an attention score using other alternative means.

Figure 9:
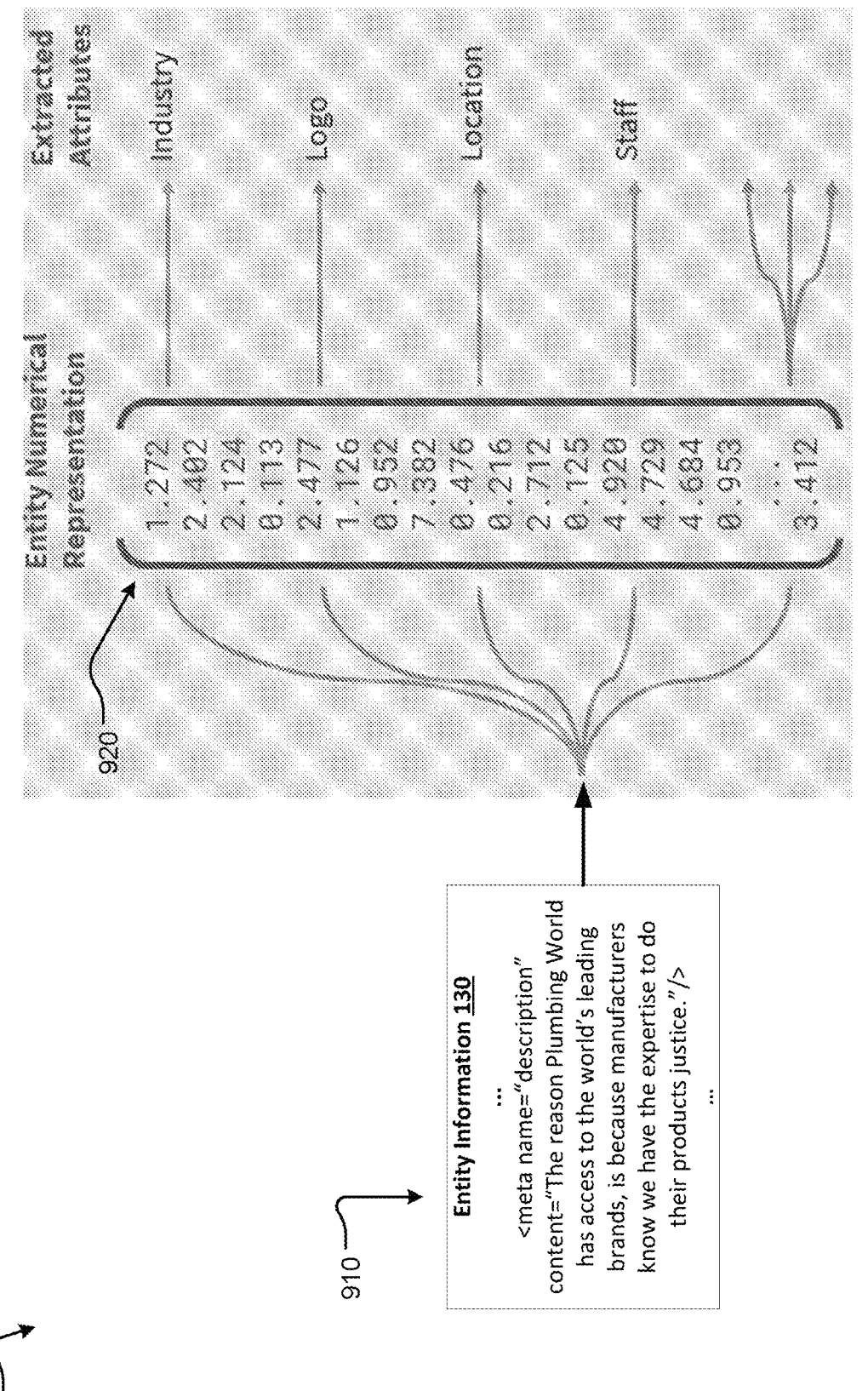
FIG. 9 is a schematic diagram illustrating a relationship between an exemplary entity information and an entity numerical representation.

FIG. 9 is a schematic diagram 900 illustrating a relationship between exemplary entity information 130 and an entity numerical representation. Block 910 refers to an example or part of entity information 130 extracted from an entity server 124. Block 920 refers to an example of a part of a numerical representation 720 generated based on the entity information 130 by the entity attribute prediction module 116. Based on the determined entity numerical representation in block 920, various entity attributes such as an entity industry classification, an entity logo, and entity location or an entity staff or employee information may be determined by the entity attribute prediction module 116. The following table illustrates examples of predicted industry classification values for some entity information 130 test data:

| Entity ID | Entity Description | Predicted Entity Industry Value | Confidence Score |
|---|---|---|---|
| Org A | Investor | Financial Asset Investing | 0.7664499879 |
| Org B | Pest Control Services | Building Pest Control Services | 0.7868804336 |
| Org C | Electrical Services | Electrical Services | 0.4925697744 |
| Org D | Dress Shop | Clothing Retailing | 0.326143831 |
| Org E | Residential Rental Properties | Residential Property Operators | 0.7091965079 |

FIG. 10 is an entity clustering infographic 1000 generated according to some embodiments. The entity numerical representation 720 generated by the entity attribute prediction module 116 may be used to generate a cluster visualisation infographic according to the steps of the flowchart of FIG. 6. Each point in the entity clustering infographic 1000 may relate to a particular entity. The relative position of the various points in the entity clustering infographic 1000 may indicate a degree of similarity or difference between the various entities based on the entity numerical representation. The entity clustering infographic 1000 may allow for efficient visualisation of similarities and differences between entities. For example, clusters 1002 and 1004 may be identified based on the relative close positioning of the points within the cluster. In some embodiments, various clusters within the entity clustering infographic 1000 may be identified using distinct colours, with each distinct colour referring to a specific cluster.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method comprising:
   providing, to a first machine learning model, entity information for each of a plurality of entities, wherein the first machine learning model has been trained to generate an entity numerical representation for each of the plurality of entities based on the respective entity information of the entity;
   determining, by the trained first machine learning model, a plurality of entity numerical representations based on received respective entity information for the plurality of entities, wherein the entity numerical representation comprises a numerical representation of the information related to the entity;
   receiving an entity search text from a computing device;
   providing the entity search text to the trained first machine learning model to generate a query numerical representation of the entity search text;
   comparing the query numerical representation with each of the plurality of entity numerical representations to determine a similarity score indicating a similarity between the query numerical representation and a respective entity numerical representation; and
   based on the determined similarity scores, identifying an entity numerical representation most similar to the entity search text,
   wherein the comparing the query numerical representation with each of the plurality of entity numerical representations is performed by a matrix multiplication operation.

2. The method of claim 1, wherein the trained first machine learning model comprises a character embedding module, word embedding module, character-word composite embedding module and a composite numerical representation processing module, and
   wherein determining, by the trained first machine learning model, a plurality of entity numerical representations based on the received respective entity information for the plurality of entities comprises:
   determining, by the character embedding module a character numerical representation for each character in the respective entity information;
   determining, by the word embedding module a word numerical representation for each word in the respective entity information;
   providing, to the character-word composite embedding module the determined character and word numerical representations;
   determining, by the character-word composite embedding module a composite character-word numerical representation for each word based on the determined word numerical representations and the character numerical representations for each respective character in each word;

providing, to the composite numerical representation processing module the composite character-word numerical representation for each word in the entity information;

determining, by the composite numerical representation processing module an entity numerical representation based on the composite character-word numerical representations.

3. The method of claim 1, wherein the entity information comprises one or more web pages hosted by an entity server associated with the respective entity.

4. The method of claim 1, wherein each of the plurality of entity representations is associated with an attribute of the respective entity, and wherein the attribute comprises one or more of: entity location, entity category, entity type and entity employee information.

5. The method of claim 1, further comprising validating the entity information, by an entity information validation module, before providing the entity information to the first machine learning model.

6. The method of claim 1, further comprising:

extracting one or more candidate logo images from the entity information of one or more entities of the plurality of entities;

providing each candidate logo image to an optical character recognition (OCR) module to determine candidate logo text associated with each candidate logo image;

determining, as an output of the OCR module, candidate logo text associated with each candidate logo image;

for each candidate logo text, determining a logo text similarity metric indicating a similarity between the candidate logo text and an entity identifier of the respective entity; and based on the determined logo text similarity metric, determining a candidate entity logo as a designated entity logo of that entity.

7. The method of claim 1, further comprising:

extracting one or more candidate logo images and respective metadata from the entity information of one or more entities of the plurality of entities;

determining a candidate logo feature vector for each of the one or more candidate logo images based on the respective metadata;

providing each candidate logo image to an optical character recognition (OCR) module to determine candidate logo text associated with each candidate logo image;

determining, as an output of the OCR module, candidate logo text associated with each candidate logo image;

for each candidate logo text, determining a logo text similarity metric indicating a similarity between the candidate logo text and an entity identifier of the respective entity;

for each candidate logo image, providing the candidate logo feature vector and the logo text similarity metric to a first logo determination model configured to determine a logo probability score;

determining, as an output of the first logo determination model, a logo probability score for each candidate logo image; and based on the determined logo probability scores, determining a candidate entity logo as a designated entity logo of that entity.

8. The method of claim 7, wherein the entity search text comprises one or more representative logo images, and wherein the method further comprises:

providing each representative logo image to the OCR module to determine representative logo text associated with each representative logo image;

determining, as an output of the OCR module, representative logo text associated with each representative logo image;

for each representative logo text, determining a logo text similarity metric indicating a similarity between the representative logo text and a designated entity logo of the plurality of entities; and based on the determined logo text similarity metric, determining a representative entity logo as being most similar to a logo image of the one or more representative logo images of the entity search text.

9. A system comprising:

one or more processors; and memory comprising computer code, which when executed by the one or more processors, causes the system to:

provide, to a first machine learning model, entity information for each of a plurality of entities, wherein the first machine learning model has been trained to generate an entity numerical representation for each of the plurality of entities based on the respective entity information of the entity;

determine, by the trained first machine learning model, a plurality of entity numerical representations based on received respective entity information for the plurality of entities, wherein the entity numerical representation comprises a numerical representation of the information related to the entity;

receive an entity search text from a computing device;

provide the entity search text to the trained first machine learning model to generate query numerical representation of the entity search text;

compare the query numerical representation with each of the plurality of entity numerical representations to determine a similarity score indicating a similarity between the query numerical representation and a respective entity numerical representation; and based on the determined similarity scores, identify an entity numerical representation most similar to the entity search text, wherein the comparing the query numerical representation with each of the plurality of entity numerical representations is performed by a matrix multiplication operation.

10. The system of claim 9, wherein the trained first machine learning model comprises a character embedding module, word embedding module, character-word composite embedding module and a composite numerical representation processing module, and wherein determining, by the trained first machine learning model, a plurality of entity numerical representations based on the received respective entity information for the plurality of entities comprises:

determining, by the character embedding module a character numerical representation for each character in the respective entity information;

determining, by the word embedding module a word numerical representation for each word in the respective entity information;

providing, to the character-word composite embedding module the determined character and word numerical representations;

determining, by the character-word composite embedding module a composite character-word numerical representation for each word based on the determined word numerical representations and the character numerical representations for each respective character in each word;

providing, to the composite numerical representation processing module the composite character-word numerical representation for each word in the entity information;

determining, by the composite numerical representation processing module an entity numerical representation based on the composite character-word numerical representations.

11. The system of claim 9, wherein the entity information comprises one or more web pages hosted by an entity server associated with the respective entity.

12. The system of claim 9, wherein each of the plurality of entity representations is associated with an attribute of the respective entity, and wherein the attribute comprises one or more of: entity location, entity category, entity type and entity employee information.

13. The system of claim 9, further comprising validating the entity information, by an entity information validation module, before providing the entity information to the first machine learning model.

14. A machine-readable medium storing computer readable code, which when executed by one or more processors is configured to perform operations including:

providing, to a first machine learning model, entity information for each of a plurality of entities, wherein the first machine learning model has been trained to generate an entity numerical representation for each of the plurality of entities based on the respective entity information of the entity;

determining, by the trained first machine learning model, a plurality of entity numerical representations based on received respective entity information for the plurality of entities, wherein the entity numerical representation comprises a numerical representation of the information related to the entity;

receiving an entity search text from a computing device;

providing the entity search text to the trained first machine learning model to generate query numerical representation of the entity search text;

comparing the query numerical representation with each of the plurality of entity numerical representations to determine a similarity score indicating a similarity between the query numerical representation and a respective entity numerical representation; and based on the determined similarity scores, identifying an entity numerical representation most similar to the entity search text, wherein the comparing the query numerical representation with each of the plurality of entity numerical representations is performed by a matrix multiplication operation.

15. The machine-readable medium of claim 14, wherein the trained first machine learning model comprises a character embedding module, word embedding module, character-word composite embedding module and a composite numerical representation processing module, and wherein determining, by the trained first machine learning model, a plurality of entity numerical representations based on the received respective entity information for the plurality of entities comprises:

determining, by the character embedding module a character numerical representation for each character in the respective entity information;

determining, by the word embedding module a word numerical representation for each word in the respective entity information;

providing, to the character-word composite embedding module the determined character and word numerical representations;

determining, by the character-word composite embedding module a composite character-word numerical representation for each word based on the determined word numerical representations and the character numerical representations for each respective character in each word;

providing, to the composite numerical representation processing module the composite character-word numerical representation for each word in the entity information;

determining, by the composite numerical representation processing module an entity numerical representation based on the composite character-word numerical representations.

16. The machine-readable medium of claim 14, wherein each of the plurality of entity representations is associated with an attribute of the respective entity, and wherein the attribute comprises one or more of: entity location, entity category, entity type and entity employee information.

17. The machine-readable medium of claim 14, wherein the machine-readable medium is a non-transient machine-readable medium.

* * * * *